US009248377B2

(12) United States Patent
Brown et al.

(10) Patent No.: US 9,248,377 B2
(45) Date of Patent: Feb. 2, 2016

(54) SYSTEM AND METHODS FOR ADAPTING OPERATION OF A COMPUTING DEVICE BASED ON INTRINSIC MOTIVATORS, PLAY PROFILES AND PLAY PERSONALITIES

(71) Applicant: PlayNovation LLC, Carmel, CA (US)

(72) Inventors: Stuart Brown, Carmel Valley, CA (US); Kristen Cozad, Carmel Valley, CA (US)

(73) Assignee: PlayNovation LLC, Carmel, CA (US)

( * ) Notice: Subject to any disclaimer, the term of this patent is extended or adjusted under 35 U.S.C. 154(b) by 0 days.

(21) Appl. No.: 14/494,401

(22) Filed: Sep. 23, 2014

(65) Prior Publication Data
US 2015/0094144 A1 Apr. 2, 2015

Related U.S. Application Data

(60) Provisional application No. 61/883,934, filed on Sep. 27, 2013.

(51) Int. Cl.
| | |
|---|---|
| A63F 9/24 | (2006.01) |
| A63F 13/67 | (2014.01) |
| A63F 13/57 | (2014.01) |
| A63F 13/65 | (2014.01) |
| A63F 13/79 | (2014.01) |
| A63F 13/822 | (2014.01) |
| A63F 13/69 | (2014.01) |

(52) U.S. Cl.
CPC .............. *A63F 13/67* (2014.09); *A63F 13/57* (2014.09); *A63F 13/65* (2014.09); *A63F 13/79* (2014.09); *A63F 13/69* (2014.09); *A63F 13/822* (2014.09)

(58) Field of Classification Search
CPC ........................................................ A63F 13/12
USPC .................................................................. 463/42
See application file for complete search history.

(56) References Cited

U.S. PATENT DOCUMENTS

| 2007/0087799 A1 | 4/2007 | Van Luchene |
| 2007/0173310 A1 | 7/2007 | Walker et al. |

(Continued)

OTHER PUBLICATIONS

U.S. Appl. No. 14/494,399, filed Sep. 23, 2014, Notice of Allowance, Apr. 9, 2015.

(Continued)

*Primary Examiner* — Omkar Deodhar
(74) *Attorney, Agent, or Firm* — Hickman Palermo Becker Bingham LLP

(57) ABSTRACT

Techniques are described herein for automatically determining a play personality of a user. Play personalities develop from play type and play patterns, which may be automatically determined by computing devices based on that user/subject's information and actions. Furthermore, in a gaming environment, the play personality of the user/subject may be represented by an avatar, doppelganger, narrative, graphic or iconic depiction. The play personality may be determined based on the avatar or doppelganger's actions, which may include but are not limited to how they respond to questions posed by non-playing characters and/or the avatars or doppelgangers of other users. Once determined, the play personality may be used as a basis for identifying and integrating intrinsic motivators and integrating user-centric design which can alter some aspect of the game environment, such as the appearance of the avatar, or the nature of a quest, or means for identifying or exploring solutions in gamification.

26 Claims, 11 Drawing Sheets

(56) References Cited

U.S. PATENT DOCUMENTS

2008/0318678 A1 12/2008 Stivoric et al.
2010/0203953 A1 8/2010 Alderucci et al.

OTHER PUBLICATIONS

U.S. Appl. No. 14/494,399, filed Sep. 23, 2014, Final Office Action, Mar. 10, 2015.
Herger, Mario, Gamification: "Extrinsic and Intrinsic Motivators on Vimeo", http://vimeo.com/88939322, last viewed on Feb. 3, 2015, 2 pages.
Brown, Stuart, "American Jounrnal of Play" vol. 2, No. 3, Strong National Museum of Play, How the Brain Makes Play Fun, dated 2010, 3 pages.
Brown, Stuart, "Play", How it Shapes The Brain, Opens The Imagination, and Invigorates the Soul, The Brain on Play, dated Apr. 6, 2010, Penguin Group, 7 pages.
Bunchball, Gamification Blog, Blaney, Erika, "Five Intrinsic Motivations and How They Impact Employee Engagement", www.bunchball.com/blog/post/1591/five-intrinsic-motivators, dated Nov. 17, 2014, 5pgs.
Deterding, Sebastian, "Gamification Designing for Motivation" Interactions, Hamburg University dated Jul.-Aug. 2012, 4 pages.
Duggan et al., "Understanding Extrinsic Versus Intrinsic Motivators in Business Gamification", Dummies.com, dated 2015, 2 pages. 215.
Fagen, Robert, "Animal Play Behavior" Introduction and Synopsis, dated Jan. 29, 1981, 3 pages.
Gamification Research Network, "Gamification Considered Harmful?", http://gamification-research.org/2014/08/gamification-considered-harmful/, printed on Feb. 2, 2015, 13 pages.
GAMIFICATION, "Intrinsic Motivation for Lasting Engagement" eLearning Industry, http://elearningindustry.com/gamification-intrinsic-motivation-lasting-engagement, 14 pages, dated Nov. 1, 2014.
Gamified UK, Thoughts on Gamification and More, "The Intrinsic Motivation Ramp", http://www.gamified.uk/gamification-framework/the-intrinsic-motivation-ramp/, last viewed on Feb. 3, 2015, 6 pages.
Bekoff et al., "Animal Play" Evolutionary, Comparative, and Ecological Perspectives, Play As An Organizing Principle: Clinical Evidence and Personal Observations, dated Jun. 1998, 2 pages.
Google.com, "Google Search, Intinsic Motivators and Gamigication", last printed on Feb. 2, 2015, 2 pages.
Watson, Zach, "Why Intrinsic Motivation is the Key to Successful Gamification", TechnologyAdvice, dated Feb. 4, 2014, 7 pages.
Klosowski, Thorin, Lifehacker, The Psychology of Gamification: Can Apps Keep You Motivated? (http://lifehacker.com/the-psychology-of-gamification-can-appskeep-you-motiv- dated Feb. 13, 2014,10pgs.
Kohn, Alfie, "Lures for Learning: Why Behaviorism Doesn't Work in the Classroom", Chapter 8, Published by Rewards, dated 1993, 11 pages.
Pankseep et al.,"The Archaeology of Mind", Neuroevolutionary Origins of Human Emotions Playful Dreamlike Circuits of the Brain, The Ancestral Sources of Social Joy and Laughter, dated 2012, 4 pages.
Pankseep, Jaak, "Affective Neuroscience" Series in Affective Science, The Foundations of Human and Animal Emotions, Social Emotions, Oxford University Press, dated 1998, 3 pages.
Pellis et al., "The Playful Brain, Venturing to the Limits of Neuroscience", One World Oxford publications, dated 2009, 3 pages.
Schore, Allan N., "Affect Dysreculation and Disorders of the Self", W.W. Norton and Company, dated 2003, 1 page.
Schore, Allan N., "Affect Reculation and the Repair of the Self", dated May 17, 2003, 4 pages.
Schore, Allan N., "Affect Regulation and the Origin of the Self" The Neurobiology of Emotional Development, dated 1994, Lawrence Erlbaum Associates, 2 pages.
Sims, Steve, Badgeville et al., "Intrinsic and Extrinsic Motivations", http://badgeville.com/2013/11/04/intrinsic-and-extrinsic-motivations, dated Nov. 4, 2013, 4 pages.
SlideShare.com, "*Gamification—Extrinsic* vs. *Intrinsic Rewards*", Published on Mar. 25, 2013, http://www.slideshare.net/playfulwingmen/gamification-extrinsic-vs-intrinsic-rewards, 10 pages.
Gartner, "Gartner Says by 2014, 90 Percent of Current Gamified Applications Will Fail to Meet Business Objectives Primarily Due to Poor Design", dated Nov. 27, 2012, 2 pages.
U.S. Appl. No. 14/494,399, filed Sep. 23, 2014, Office Action, Nov. 6, 2014.

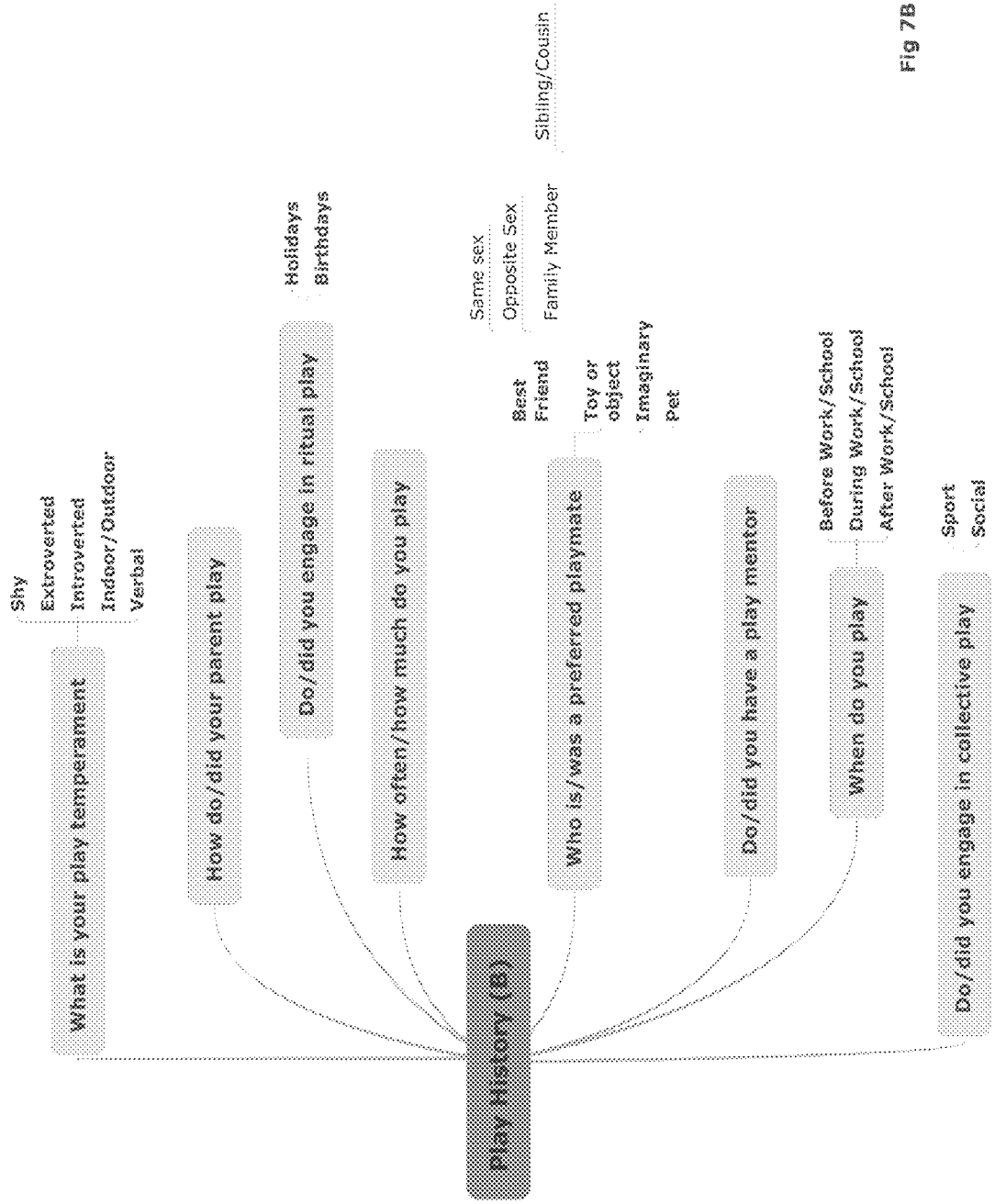

INTRINSIC MOTIVATORS IN THE DEVELOPMENT OF PLAY PERSONALITY

SYSTEM AND METHODS FOR ADAPTING OPERATION OF A COMPUTING DEVICE BASED ON INTRINSIC MOTIVATORS, PLAY PROFILES AND PLAY PERSONALITIES

CROSS-REFERENCE TO RELATED APPLICATIONS; BENEFIT CLAIM

This application claims the benefit of U.S. Provisional Application No. 61/883,934, filed Sep. 27, 2013, the entire contents of which is hereby incorporated by reference as if fully set forth herein, under 35 U.S.C. §119(e).

This application is related to U.S. patent application Ser. No. 14/494,399 filed Sep. 23, 2014, entitled "SYSTEM AND METHODS FOR IDENTIFYING INTRINSIC MOTIVATORS, PLAY PROFILES AND PLAY PERSONALITIES THROUGH CAPTURED ACTIONS IN AN ONLINE ENVIRONMENT"; the entire content of which is incorporated by this reference for all purposes as if fully disclosed herein.

INTRODUCTION AND BACKGROUND

Play is endemic in the animal kingdom and nowhere is play more prevalent than in the human species. Mammals in general and people in particular are born to play. Mammalian brains are not only hardwired to engage in and experience the positive feedback of play, the instinctual drive for play is deeply seated subcortically. Consequently, it is a very basic instinct and trait.

The subject of play has received considerable scientific and scholarly attention, particularly since the 1960's. That body of work is summarized below and citations to some of the principal sources are included. Those skilled in the art will appreciate that this is an ongoing study which adds to the fund of knowledge supporting the principles set forth herein.

Like most basic instincts, failure to actualize the trait has harmful consequences for the host system. Play deprivation has been thoroughly studied in several animal models while it has been observed in humans. At best, when occurring after major brain (neuronal) development, play deprivation leads directly to depression. At worst, whether experienced during ongoing brain development in juveniles or thereafter, play deprivation of any significant mode or duration contributes to antisocial and sometimes aggressive behavioral manifestations which can be violent.

On the other hand, allowing or fostering healthy play attitudes and adaptations have a positively beneficial impact on physical and emotional development. These benefits can be observed literally post-partum, when infant and mother engage in the most fundamental form of play, attunement, which serves to form the beneficial linkage between them. As the infant matures, s/he naturally experiences a range of play environments discussed more thoroughly below. These include, for example, rough and tumble play, social play, object play, competitive play, and many others. Each type of play aids in the enrichment of neuronal development and in turn manifests itself in emotional traits and what is now termed emotional intelligence. Play types are mutually reinforcing as developmental catalysts. So, as humans, healthy and active play aids the pathway development for such traits as teamwork, problem-solving, self-regulation, empathy and creativity, to mention but a few.

Play scientists experiment with animal models that translate to humans but, for obvious reasons, observe human play personalities. There is close correlation between the two—experimentation and observation. It has been determined that there is a continuum between what animal field research reveals and the presence of animal play personalities that demonstrates linkages to the fundamental development of human play personalities. Thus, Panksepp et al. demonstrated that play circuits reside in the survival center of the brain by studying the play patterns of decorticated rats. *Effects of Neonatal Decortication on the Social Play of Juvenile Rats*, Physiology and Behavior, 56 (1994) at 429-443. The decorticated rats nevertheless remained attuned to and engaged freely in complex rough and tumble play and vocal play signaling. Panksepp has demonstrated over the years the direct correlation between his rat models and human brain physiology.

Pellis et al. solidified Panksepp's work through extensive experimentation on rat and other mammalian models, showing solid evidence of the consequences of play deprivation. *The Playful Brain, Venturing to the Limits of Neuroscience*. Oneworld Books (2009). This work compiles animal play data substantiating the effects of play as a contributor to development both of organic cortical (neuronal) density and the socio-emotional behaviors attributable thereto. Likewise, Pellis et al. link play deprivation and suppression to diminished social, emotional and cognitive competency in a broad range of laboratory-controlled, play-observed social animals including rats and others.

Play is so deeply rooted in mammalian brain systems that it has been shown to be a fundamental drive, as are the drives for food, sleep and sex. As written by the present inventor in his book, *Play: How it Shapes the Brain, Opens the Imagination and Invigorates the Soul*, Avery (2009), the impulse to play is internally generated and generally pre-cognitive. Consequently, just as sleep deprivation is known to lead to the kind of cortical imbalance contributing to impaired judgment, play deprivation has a similar effect. The differences arise in the periodicity of the impairment, whereas sleep deprivation can manifest itself in a matter of days play deprivation requires longer periods of time before serious effects can be recorded. Nevertheless, suppression of this strong drive for play and playful activities seated in the survival centers of the brain inevitably and eventually suppresses healthy social development and interaction and can seriously impair judgment and emotional balance.

These roots of play spring from two fundamental factors that underlie all mammalian play. They are "attunement" and "temperament."

Attunement arises at birth. In a healthy human mother-infant relationship, the two lock eyes and the infant exhibits an intrinsic response to the mother's gaze. It is a state that is hardwired into the nascent brain just as breathing and sleeping. It is an observable state, as one watches the facial expressions and posture of the infant. This is confirmed by Electroencephalography (EEG) studies which track the brain activity of both mother and infant. See Shore, Allan *Affect Regulation and the Origin of Self: The Neurobiology of Emotional Development* (1994), Lawrence Erlbaum & Associates (Pub.) Attunement is accompanied by a joyful state of play that prepares the infant to experience the entire range of play types discussed below.

Temperament develops in a human as the combination of nature and nurture. On the side of nature, a person's temperament is shaped by genetics and gating events such as the ability to perceive (cognitive threshold) and the person's state of developmental maturation. Nurture contributes to the person's temperament through the environment in which she develops from infancy through the juvenile years when much of her temperament becomes fixed. Exogenous environmental factors include exposure to a range of activities such as music and physical exercises, coupled with the dynamics of the family in which she is raised. Endogenous environmental factors impacting temperament include such matters as safety and nutrition.

One's temperament exhibits tendencies that evolve during childhood. One may show the tendencies toward shyness while others may find it more comfortable as an introverted or extroverted person. These, though, are tendencies and are not firmly fixed in the sense that one is predestined to a particular temperament. *The Long Shadow of Temperament*, Kagan, J. C. & Soudman, C. (2004), Harvard Univ. Press.

Attunement and temperament may be catalyzed positively and negatively. A child raised in a loving family with wholesome attention, having proper nutrition and living in a safe environment will tend to have positive attributes that display themselves in a rich and robust play personality. Contrariwise, there are factors that augur against the states of attunement and temperament that lead to that result. Anti-attunement and anti-temperament influences are most typically related to physical or mental disabilities. These include but are not limited to such factors as abuse, isolation, starvation and disease. However, except in the most extreme cases, these negative influences are capable of remediation and the person can then develop beneficial play patterns.

Within human play and its foundation of attunement and temperament emerges what is widely regarded as intrinsic motivation. Just as each play personality is uniquely individual, so too are an individual's intrinsic motivators. Intrinsic motivation is frequently defined as participating in an activity for its own sake, out of interest and for the pleasure and satisfaction from simply performing it. Intrinsic motivation does not necessitate an outside stimulus to foster its emergence. Educational research has shown that students with a more intrinsic motivational orientation will tend to outperform those who have been accustomed to extrinsic reward systems (C. Dweck, W. Glasser, A. Kohn). Education is not alone in these findings. Research in other fields has indicated similar results as it relates to job performance, innovation, self-management and more. Long-term behavioral change occurs when intrinsic motivators are engaged.

While many psychologists and social scientists have explored self-determination theories that include the roles of intrinsic and extrinsic motivation, they neglect to link the identification and development of intrinsic motivators with the survival drive to play. Perhaps this is because play was commonly denigrated as a "waste of time" and "unproductive" during the height of industrialized mass production, when focused attention on work was revered and nose-to-the-grindstone drive was considered what it took to get ahead. Or maybe it is because it has only been relatively recently that neuroscience has demonstrated play as a fundamental survival drive. In any case, there is no question that there has been an historic bias against play on many levels.

However, the world is changing rapidly and the traditional industrial-financial economy and its jobs are in major disruption. What is emerging is the global creative economy. The majority of the jobs of the future have not been invented yet.

Play is the genesis of innovation and fosters self-regulation, resiliency and creativity humans need to adapt to a rapidly changing world. Those who play have a competitive advantage.

Stanford Psychologist Albert Bandura's social learning theory, which emphasizes self-efficacy, highlights that external, environmental reinforcement as not the only factor to influence learning and behavior. He described intrinsic reinforcement as a form of internal reward, such as pride, satisfaction, and a sense of accomplishment. These contribute to the individual's belief in his own competencies and capacities, his self-efficacy. It is Bandura's research that has influenced David Kelley, Founder of IDEO, one of the world's most innovative design companies, and Founder of Stanford University's famed d.school, the Hasso Plattner Institute of Design. Bandura provided inspiration to David Kelley and his brother Tom's book, Creative Confidence: Unleashing the Creative Potential Within Us All. The Kelley brothers shatter the myth that only some people are creative. They show, and Play Science elaborates, that everyone is intrinsically creative.

Dan Pink, author of Drive: The Surprising Truth about What Motivates Us, shows that carrots and stick extrinsic motivators can achieve precisely the opposite of their intended aims. Rewards can transform an interesting task into a drudge. They can turn play into work. Traditional "if-then" rewards can give us less of what we want. They can:

Extinguish intrinsic motivation
Diminish performance
Crush creativity
Crowd out good behavior
Encourage cheating, shortcuts and unethical behavior
Become addictive, and
Foster short-term thinking.

Nobody knows exactly how the emerging creative economy will fill the void left by industrialization. However, trends such as the DIY and Maker Movement indicate that the people who tap into and sustain their innate interests and talents will develop levels of mastery in skills very valuable for the future, all the while enjoying the beneficial outcomes of their biological design to play. This is in alignment with GoogleX leader Astro Teller recently indicating "we've just failed so far to get technology to its higher purpose, which is to get technology out of the way." (techcrunch.com/2014/05/06/googlex-head-of-moonshots-astro-teller-technology-should-make-you-feel-more-human-not-less-human/)

The following, including the references cited therein, are representative of publications relating to the topic of play.

In his 1938 book, *Homo Ludens* or "Man the Player" (alternatively, "Playing Man") (1950), Roy Publishers English Translation, Dutch historian, cultural theorist and professor, Johan Huizinga discusses the importance of the play element of culture and society. Huizinga uses the term "Play Theory" to define the conceptual space in which play occurs. Huizinga suggests that play is primary to and a necessary (though not sufficient) condition of the generation of culture.

*Play—Its Role in Development and Evolution*, edited by Jerome Bruner, Aslison Jolly, Kathy Sylva, (1976) Basic Books, is a seminal collection of essays and articles, edited to present the then-existing knowledge base about play.

*Ontogeny and Phylogeny*, (1977) The Belknap Press of Harvard University, by paleobiologist Stephen Jay Gould, painstakingly develops the evidence for neoteny as a basic biological pattern of design for humans and that play is a hallmark of neotenous creatures. This forms a credible basis for later anthropologic reviews that demonstrate human's hunter-gatherer heritage as being consistently playful.

Robert Fagen, *Animal Play Behavior* (1981) New York, Oxford University Press, presents a comprehensive, descriptive magnum opus on animal play that demonstrates the patterns of play, including body, object, social, gaming play, etc., as summarized hereinbelow.

Mihai Spariosu, *Dionysius Reborn: Play and the Aesthetic Dimension in Modern Philosphical and Scientific Discourse*, (1989) Cornell University Press, places into a broad perspective the historic and contemporary philosophical discourses relevant to play and contemporary science (though not neuroscience) including quantum theory. This work anticipates the later Panksepp and Pellis neuroscience findings that play is both rational and pre-rational.

In his work, *Bright Air Brilliant Fire: On the Matter of the Mind*, (1992) Basic Books, dual Nobelist Gerald Edelman provides a solid hypothesis and preliminary evidence for what now is becoming widely accepted as epigenetic cerebral cortical "turn-ons" prompted by environment (play) inputs which induce the creation of new cortical "maps." As attempts to correlate clinical human play observations with basic science findings, a more comprehensive view of both the overall clinical expressions peculiar to play, and mammalian evolutionary heritage is becoming clearer with evidence from both camps to substantiate it.

*Animal Play, Evolutionary, Comparative, and Ecological Perspectives*, Marc Bekoff and John Byers (ed.) (1998) exemplifies the validity and utility of animal neuroscience as a base for ther study of mammalian play patterns. The present inventor is the author of the article titled, *Play as an Organizing Principle, Clinical Evidence and Personal Observations* (Chap. 12). This contribution is a foundation for the synthesis between animal play patterns and deprivational findings in both animals and humans.

*The Ambiguity of Play*, Brian Sutton-Smith (1997) Harvard University Press is a foundational work describing play in all its variations and providing the ground for human flexibility adaptability and innovation.

*Affective Neuroscience-The Foundations of Human and Animal Emotions*, Jaak Panksepp (1998) Oxford University Press, is considered by many scientists a paradigm shifting work in the field of play neuroscience. Among other groundbreaking contributions to the science of play, this work by Panksepp, primarily studying and objectifying rat play and other basic rat behaviors, established play as a survival drive among playful social mammals.

*The Nature of Play: Great Apes and Humans*, Anthony Pelligrini, Peter K. Smith (2005) Guilford Press, studies both playground and ape ethologic observations and shows, for example, the importance of rough and tumble play in both humans and apes for subsequent social competency and development.

Sergio and Vivien Pellis, *The Playful Brain, Venturing to the Limits of Neuroscience* (2009) One World, Oxford, substantiates Panksepp's work, and extends it to demonstrate the behavioral consequences of adequate play, as well as the dire effects of deprivation.

*The Archaeology of the Mind, Neuroevolutionary Origins of Human Emotions*, Jaak Panksepp and Lucy Bivens (2012), W.W Norton & Co., New York, London, is another compendium of information concerning play in mammalian species. In their work, these authors demonstrate that the generation of play develops the cortical circuits necessary for social-emotional-cognitive competencies.

Those skilled in the art may also confer The American Journal of Play, on whose editorial board the present inventor serves, for additional scientific and scholarly works in the field.

As is apparent from the preceding summary, there is a robust literature on the science and application of play as a fundamental aspect of human development and healthy human emotions. However, there are no means for translating that fund of essential knowledge into practical applications that can benefit individuals either in their personal or business lives.

BRIEF DESCRIPTION OF THE FIGURES

FIGS. 7A and 7B exemplify a play history questionnaire which can be administered by a clinician to a subject or used without such supervision by a user, which is a guided set of question topics to gather data concerning a person's play history;

DETAILED DESCRIPTION OF PREFERRED EMBODIMENTS

Figure 1:
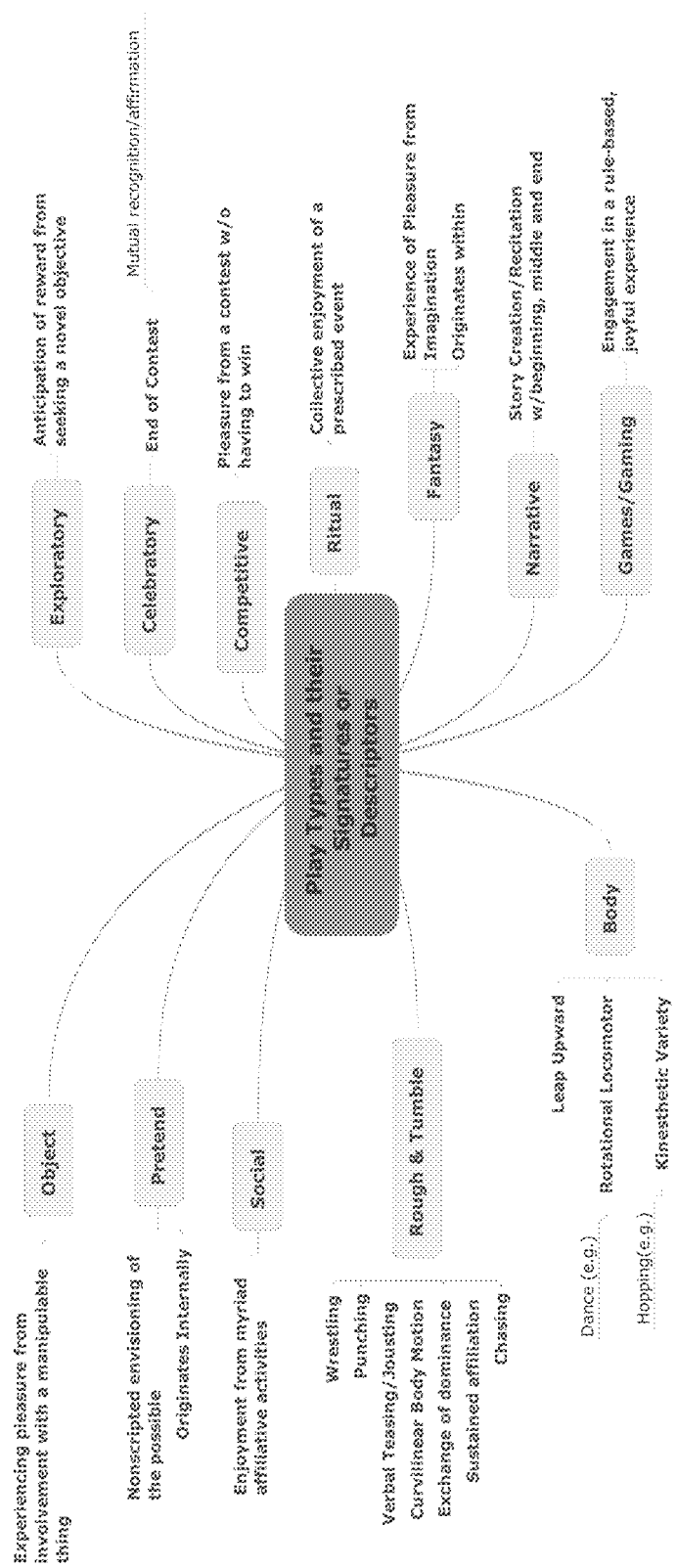
FIG. 1 illustrates the principal play types/patterns along with their signatures or descriptors.

As illustrated by the citations provided herein, there is a rich and robust literature on the science of play. Many scholars and scientists have studied play from its roots deeply seated in the brain to the manifestation of each of healthy and suppressed play patterns on human behavior. The science is precise. However, there has been no systematized pairing of theory and practice into tools usable by clinicians and individuals.

Techniques and systems are described hereafter for:
determining a person's "play personality"
narrating or graphically representing play types/patterns and play personality
identifying intrinsic motivators through play
storing and updating a "play profile" for the person
performing actions based on the profile to help ensure that the play needs of the person are met.
assessing and identifying/determining Play Deprivation As used herein, the "play personality" of a person indicates the types of play that best satisfy the play needs of the person. For example, the play personality of one person may indicate that narrative play best satisfies the play needs of the person, while the play personality of another person may indicate that rough and tumble play best satisfy the play needs of the other person. The "play profile" of a person is a set of one or more electronically-stored records that reflect the person's play personality.

A user's play personality may be represented in a variety of ways. For example, in one embodiment, a play personality is represented by a detailed narrative report that indicates the weighted play types/patterns of a user, and may include an indication of any play deprivation. A play personality can be displayed graphically. A graphical representation of a play personality my include:
icons based on weighted play patterns
symbols
caricatures
an avatar
animals
colors, etc.

According to one embodiment, regardless of the specific form of the graphical representation of a play personality, that representation is dynamic and can change as the play personality shifts over time.

An "activity profile" is a record of the activities in which a user is currently engaged. If the activity profile indicates that a person's play needs, as indicated in the person's play profile, are not being satisfied, then the person may have a "play deficit".

In one embodiment, play personalities may be represented in a play profile by weights for each type of play type, where play types that are more satisfying to a person are assigned higher weights in that person's play personality. For example, a user that derives the greatest fulfillment from rough and tumble play may have the play profile:

object 0.2
pretend 0.3
social 0.5
rough and tumble 0.9
body 0.8
exploratory 0.3
celebratory 0.4
competitive 0.7
ritual 0.2
fantasy 0.1
narrative 0.1
games/gaming 0.3

In contrast, a person that derives greatest fulfillment from narrative play may have the following play profile:

object 0.2
pretend 0.6
social 0.8
rough and tumble 0.2
body 0.3
exploratory 0.3
celebratory 0.4
competitive 0.3
ritual 0.6
fantasy 0.8
narrative 0.9
games/gaming 0.7

As shall be described in greater detail hereafter, there are many ways in which a person's play personality may be representative, and embodiments of the invention are not limited to storing weights for each play type.

Uses of Play Personalities

The techniques and systems described hereafter make use of activity profiles and play personalities so play can productively be incorporated into one's life in a proactive, meaningful and effective manner. As shall be evident by the systems and techniques described hereafter, there are many benefits to humans from understanding of a person's or group's play personality. These include the following:

There is broad applicability for improved adult personal life functioning and overall improved competency in such matters as personal development programs, life coaching, career development and similar lifestyle activities.

The evaluation of human resources career/job placement by finding "good fits" between a person's play and overall personality and job requirements. For example, assaying one's play personality can yield an understanding of the person's metaphoric thinking skills and thus suggest a career in engineering or the like. Along these lines, understanding the play tendencies of a workforce or select segment of it can aid in positive and effective organizational development.

Parents and teachers can strive to optimize each child's welfare and innate competitive advantage(s). Assaying a child's play allows parents and teachers to identify, implement and enrich the child's internally generated natural play proclivities, intrinsic motivators, and their play talents and exploration, all while supporting life mastery. This is the antithesis of the "Tiger Mom" approach to parenting where "performance expectations" come from outside the child, may not be in harmony with the child's temperament and natural play proclivities, and tend to be linear, rigid and narrowly focused. It is also postulated (by Panksepp) that appropriate play regimes can be helpful for children diagnosed as ADHD, allowing for the reduction and perhaps elimination of drug therapy.

It is known that play fosters curiosity and creativity. Identifying the play regimens of a workforce or selected members within it can point to ways management can inspire better design and innovation practices within an organization.

Community development and fostering inclusiveness in disparate ethnic or cultural populations can be promoted through play. Properly structured playful activities can level the playing field and promote tolerance and cooperation. This has the capacity to yield senses of belonging, meaning and purpose that undergird the feeling or experience of community. Play can also become the basis for learning and applying conflict resolution techniques. Play can develop empathy, self-regulation, a sense of belonging, tolerance and resiliency, and social skills—the essence of community building and conflict resolution.

Inasmuch as play deprivation or suppression has deleterious effects in a human population, there are applications for play "therapy" in such socially dysfunctional situations as racial and ethnic conflict, high school drop-out, teen pregnancy, gang participation, anger management, obesity, depression, addiction disorders, obsessive-compulsive disorders, and others.

Compatibility and intimacy are fostered by actualizing one's play personality. Identifying one's play patterns and tendencies can aid in developing and sustaining deeper engagement in human relationships.

Gaming and particularly video gaming is too often thought of as violence-based. However, gaming technologies now permeate educational curricula to drive learning, within health industries to prevent and treat disease, in corporate innovation programs and similar settings where learning or knowledge acquisition is made to be enjoyable, self-paced and engaging. Gaming design and play within virtual worlds can be harmonized with, and grounded in, the human biological design to play through the actualization and integration of play profiles and personalities in the design development process.

Geriatric programs are envisaged to be improved by incorporating play-infused programs for the elderly, especially associated with developing engagement in the pre-cognitive areas with those identified with dementia.

Various embodiments are described hereafter in which a system automatically compares and contrasts data in two databases to yield a play personality and a play quotient, both absolutely and relatively, and then allows the user (whether or not aided by a clinician) several options in response thereto. In its simplest manifestation, a computer implemented system stores a first set of data in an updatable historical database containing background information on play and its parameters, drawn initially from the scholarly work described above and known to those of ordinary skill in the art, and a second set of data characterizing the play history of a user or subject.

The user data can then be compared with the historical data and several results may be drawn from that comparison. These aspects of the present invention are described in detail below.

The instant system may be deployed in several alternative ways to realize or achieve its benefits. The systems may be "administered" by a clinician, who typically will be a person having background skill, knowledge and experience in the science of play. When the system is administered, the person whose profile is being taken by the clinician is termed herein as a "subject." However, there are no strict requirements that the system be administered and that is one of its basic benefits—that an individual may self-administer the methodology equally efficaciously. When self-administered or otherwise without the guidance of a clinician, the person whose profile is being deduced is termed a "user" to distinguish those two modalities.

Play Types/Patterns

According to one embodiment, a system stores in memory data indicative of a number of play types, such as those illustrated in FIG. 1. Each play type is accompanied by a set of signatures or descriptors. FIG. 1 describes those play types generally most relevant to human manifestations of play, though those skilled in the art may wish to add others they desire to complement those illustratively shown in the figure.

The play types selected by the present inventor include, Object, Pretend, Social, Rough and Tumble, Body, Exploratory, Celebratory, Competitive, Ritual, Narrative, Fantasy and Games/Gaming. Each play type is accompanied by a set of signatures or descriptors differentiating them from one another without significant overlap.

For example, Pretend Play is characterized by play that originates internally to the user or subject, and results in a state of play induced by imaginary context and content. Contrast Pretend Play with Narrative Play. The latter is characterized, for example, as the creation of a story having a beginning, middle and end. Though one may perceive similarities, the two remain sufficiently distinct that activities or behaviors can confidently be placed into one or the other. The same is true when one further considers Pretend Play, which shares certain similarities with both Fantasy and Narrative types of play. Those similarities notwithstanding, the "nonscripted" element of Pretend Play differentiates it from Narrative Play which tends to develop a script as intrinsic to the story or Fantasy Play in which there is a particular context. This is not to say that a user or subject will not engage in all of these types of play, Fantasy, Pretend and Narrative, and those skilled in the art would indeed expect a person to enjoy all as well as other play types as part of their play personality. The more important point of the categorization among these play types is the ability to recognize and analyze each of them separately and distinctly.

In a like vein, Rough and Tumble Play is closely allied with Competitive Play, whereas Competitive Play and Celebratory Play share common attributes. For example, Rough and Tumble Play is characterized by the signatures shown associated with that play type in FIG. 1. What separates Rough and Tumble Play from Competitive Play, such as football or basketball as forms of team oriented Competitive Play or fencing as an individual style, is the "exchange of dominance" factor in the former which is volunteered during the Rough and Tumble play session. While Competitive Play environments yield an exchange of dominance as one team/individual or the other is poised to score, that exchange is not volitional but occurs as a natural consequence of and is intrinsic to the manner in which Competitive Play develops within a scripted set of rules or guidelines and carries on as one scores or another steals the advantage. Thus, it is volitional exchange as opposed to aggressive exchange which is a distinguishing signature. Then too, while there may be moments of celebration during a session of Competitive Play, Celebratory Play is characterized as a celebration at the end of a contest. Along these lines, in a Competitive Play mode at its conclusion, one team will win the contest and the other will lose. Celebrations during the contest generally occur when one or the other scores and reveals the exuberance of the score as opposed to the winning of the contest itself. Celebratory Play can involve both winning and losing players as they come together after the competition is won in mutual recognition of the way the contest was played and played out.

The Transformational Nature of Play

By observing the patterns of play or "play types" as they emerge developmentally in both animals at play and humans, the capacity for broad transformational outcomes become apparent. An example of early human play in the gleeful exchange between mother and infant demonstrates its capacity to add new dimensions to that exchange in each. The baby smiles as a signal of its glee, and the mother responds with lilting "baby talk". Then as the exchange continues over time, the baby begins to vocalize in a playful musical cadence. This transformation would not occur without the playful interaction (social play). In animal play, the movements associated with a cat or badger playing with a moving ball creates new complex bodily movements that otherwise do not occur when such play is avoided during controlled circumstances. Thus the transformative socialization in the first example, and the bodily skills transformation in the second, demonstrate the capacity of play to initiate and sustain transformations.

Transformations through play occur through the intrinsic motivation to participate in an activity or interaction for the sheer enjoyment of it. Such self-motivated and self-sustained activity over time leads to innovation, creativity, skill development and mastery. Extrinsic motivation and external reward systems may temporarily increase measured performance goals, however they generally do not transform behaviors over long periods of time precisely because they do not engage the intrinsic motivators that can be found through play.

Handicapping

An innately operative aspect of play seen in humans and animals is the ability to harmonize widely variant strengths and skills which allow play to continue. Examples from the animal world in the wild include such observations as a wild polar bear (1200 lbs) and a sled dog (100 lbs.) engaging spontaneously and repeatedly in a prolonged bout of rough and tumble play. The bear restrains his much greater strength, and plays subserviently or deferentially to the sled dog at times in a give-and-take fashion so as to allow the play to continue. In more complex human games, for example, the maintenance of enduring playful competition in golf or bowling demonstrate the principle of playful handicapping by giving a less accomplished competitor points to keep the play going with mutual enjoyment despite widely varying strengths or abilities.

Play Dynamics

Figure 2:
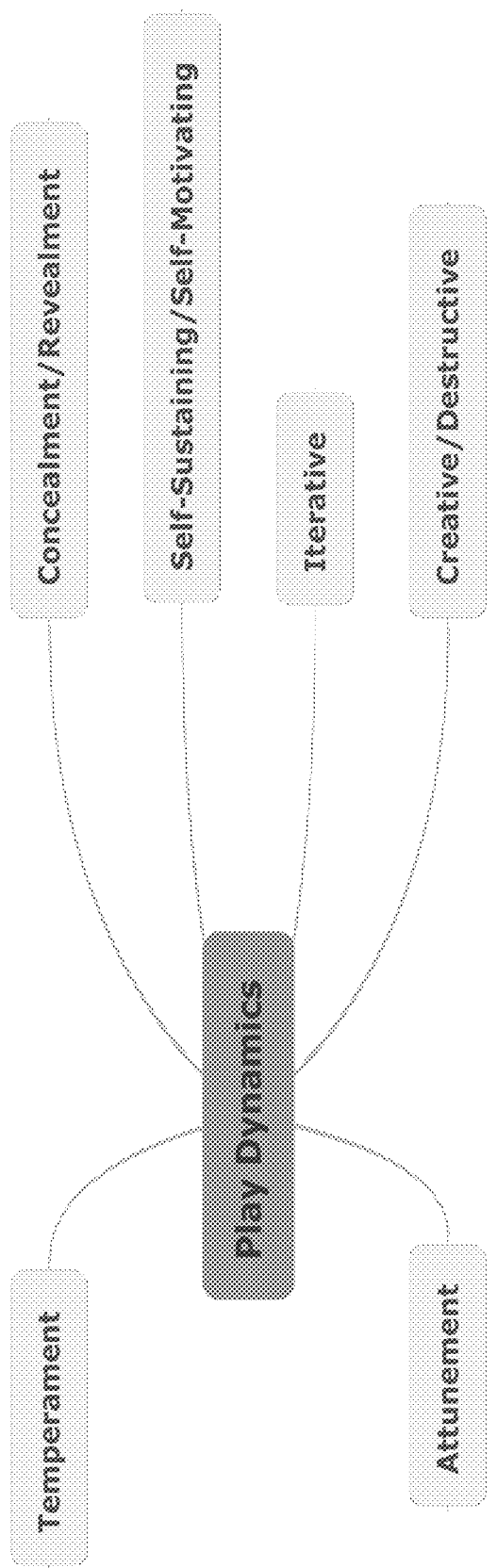
FIG. 2 illustrates selected, exemplary play dynamics.

The array of exemplary play types depicted in FIG. 1 is allied with several play dynamics shown diagrammatically in FIG. 2. "Play dynamics" generally refers to how play can happen and/or is expressed. Play dynamics are, as with all of the essence of play itself, influenced by a person's temperament and attunement to play as noted herein. Play dynamics include concealment/revealment, self-sustaining and self-motivating, iterative and then those that are either creative or destructive. These broad dynamics or expressions of play are ways of framing the ongoing process of play to reveal a person's play personality in accordance with the present invention.

Play Triggers

Figure 3:
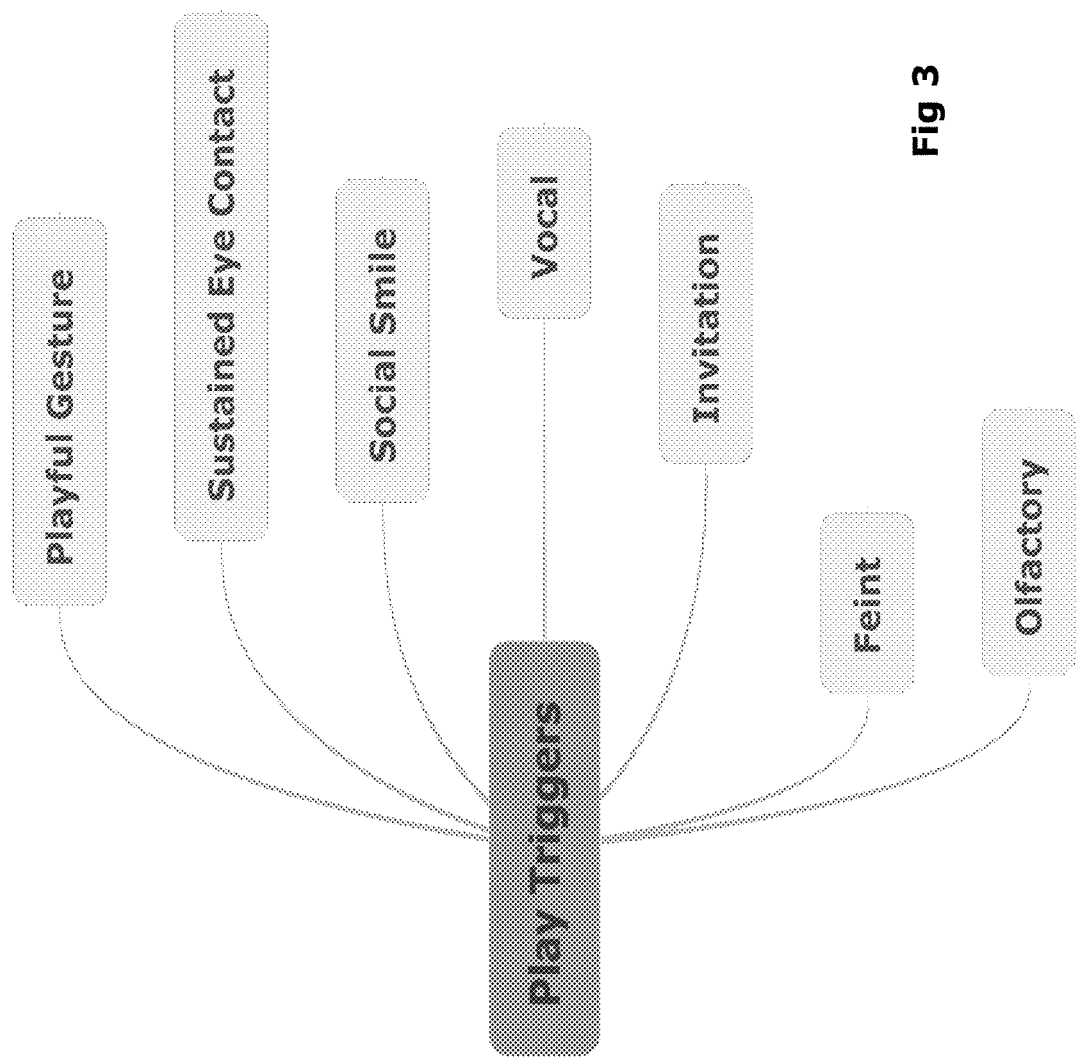
FIG. 3 illustrates a range of selected play triggers.

FIG. 3 displays a number of predominant play triggers, the precursors or invitations to play. There are the obvious or overt triggers such as an explicit invitation or other vocalization. Others are more in the nature of suggestions, such as a playful gesture, a social smile or sustained eye contact. Still others are more masked but still possess a strong incentive or invitation to play. This includes, for example, certain smells that create a memory or recollection associated with a person's play history or other appeals to the senses that are reminiscent of previous play activities. These and other intrinsic and extrinsic triggers can initiate interpersonal play or self-created and sustained play episodes.

Play Contexts

Figure 4:
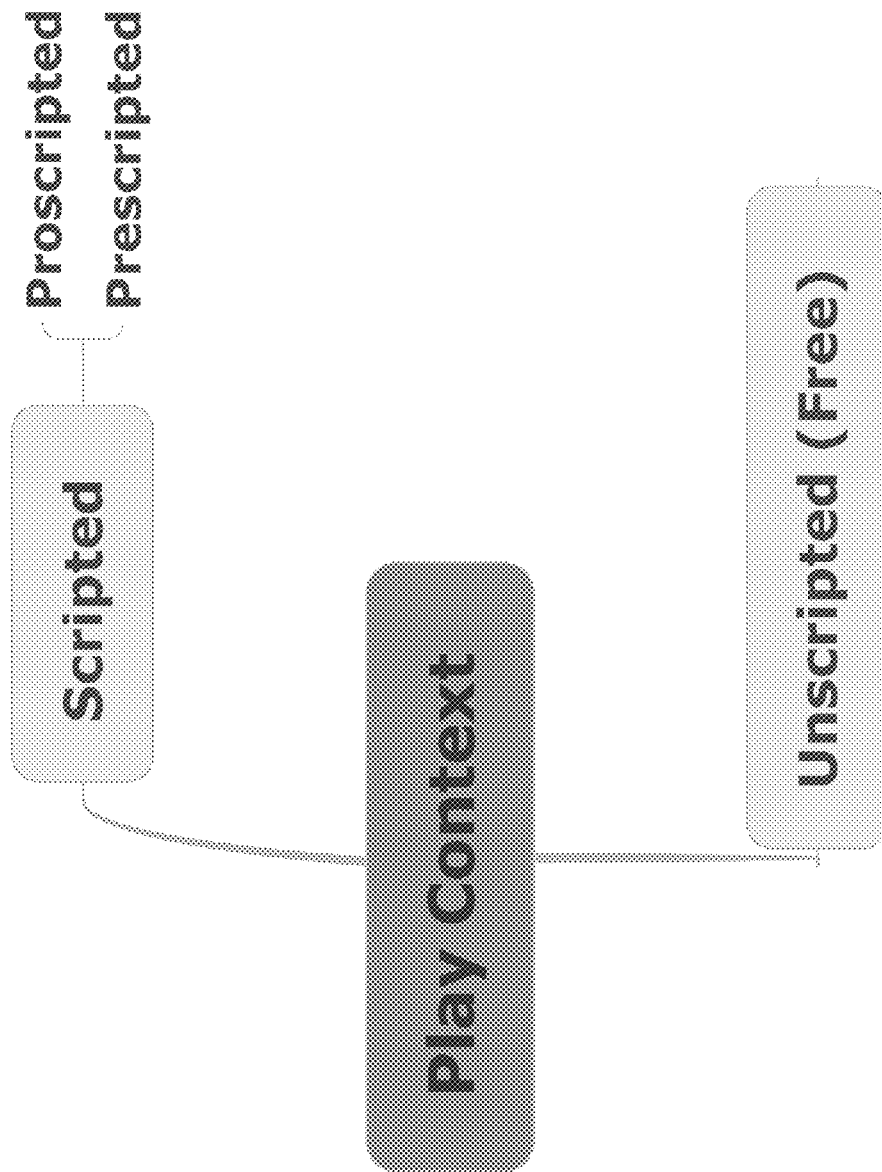
FIG. 4 shows a pair of play contexts that can differentiate various aspects of the play types shown in FIG. 1.

FIG. 4 illustrates two particular play contexts. They are scripted and unscripted play. Unscripted play embraces those play types that tend to be spontaneous such as Fantasy Play or Rough and Tumble Play and would skew toward those play types that are undertaken alone such as many forms of Pretend Play. Scripted play types usually concern play that has rules such as Competitive Play or many forms of Object Play, such as golf. Some rules prescribe the manner in which the play is to be conducted, such as the actions that are allowed when playing baseball. Other rules are proscriptive in the sense they rule out certain actions or, in Object Play, certain devices or the like that cannot be used. There is another variant of scripted and unscripted play that sometimes occurs, as when adults vis-à-vis children proactively manage or oversee a child's or children's play activities. If taken to an extreme, the activity in question loses much if not all of its value as play and can have harmful effects when this occurs over an extended period of time.

The Historical Database

Figure 5:
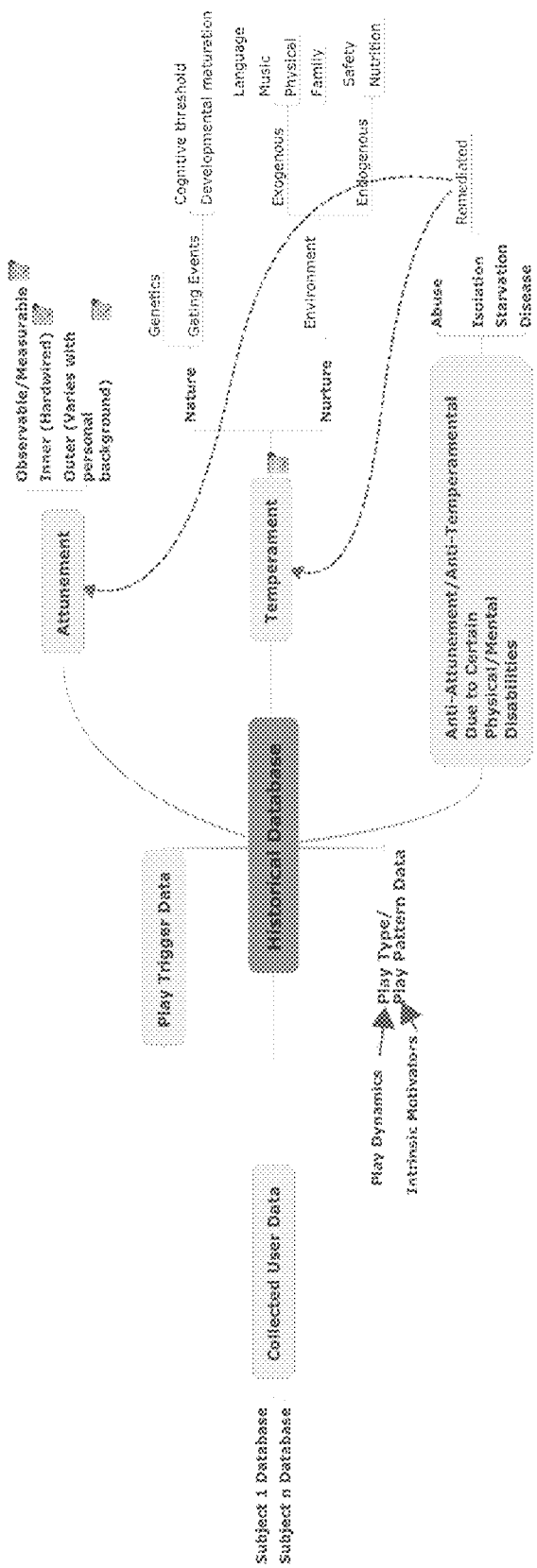
FIG. 5 illustrates the hierarchal arrangement of a computer memory, partitioned into sectors that comprise an historical database containing background data with feedback to achieve heuristic updating either continuously or periodically.

FIG. 5 shows the overall content and general structure of the Historical Database. The Historical Database initially houses data coming from the scientific and scholarly literature described both specifically and generally above. Preferably, the Historical Database is posted to a server with access allowed to a set of permitted individuals authorized to write to the database. Alternatively, the Historical Database is cloud based with access either open or restricted. In any of these situations, permitted individuals are preferably allowed to write and read but not delete or modify any data.

Also, in the preferred embodiments, the Historical Database is updated heuristically as individual users or subjects access the system to make use of its features and advantages. More specifically, as the system is accessed by users (either self-administered or under the supervision of a clinician), the data they enter as representative of their play histories are added to the data already resident in the Historical Database to increase its breadth and depth of actionable, addressable intelligence.

The Historical Database contains sectors related to play types, including play dynamics/intrinsic motivators and play triggers, all of which will be used when a user interacts with the system as described more fully below. The Historical Database further includes sectors dealing with certain of the very basic elements of play that will be common among all users. These are predominantly in the categories of "Attunement" and "Temperament" and their antagonists as described more fully above.

In one embodiment, the Historical Database contains global data covering all users for whom data is available. In alternative embodiments, the Historical Database only has data for users that have certain attributes (e.g. Hispanic males living within the United States). In yet other embodiments, the Historical Database has global data covering all users, but has a mechanism for extracting from the database historical data for subsets of the users. In embodiments where historical data may be extracted for subsets of users, the historical data used for any given user may be the historical data for the users that are similar to that given user. For example, the historical data for Hispanic males living in the U.S. may be used in relation to a Hispanic male that lives in the U.S. Similarly, the historical data for white females that play golf may be used in relationship to a white female that plays golf.

Determination of Play Personality

Figure 6:
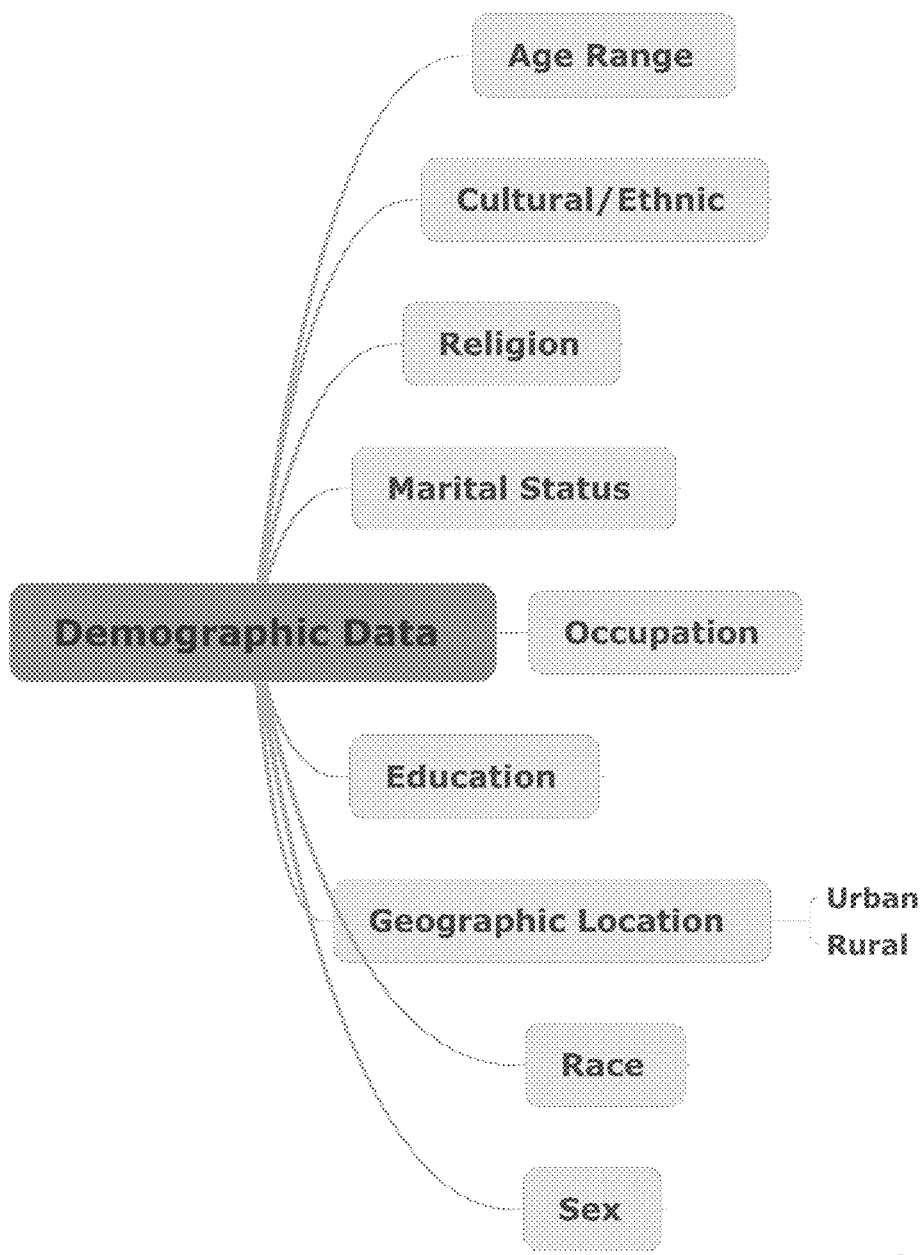
FIG. 6 is a background questionnaire that elicits demographic data from a user or subject.
Figure 7A:
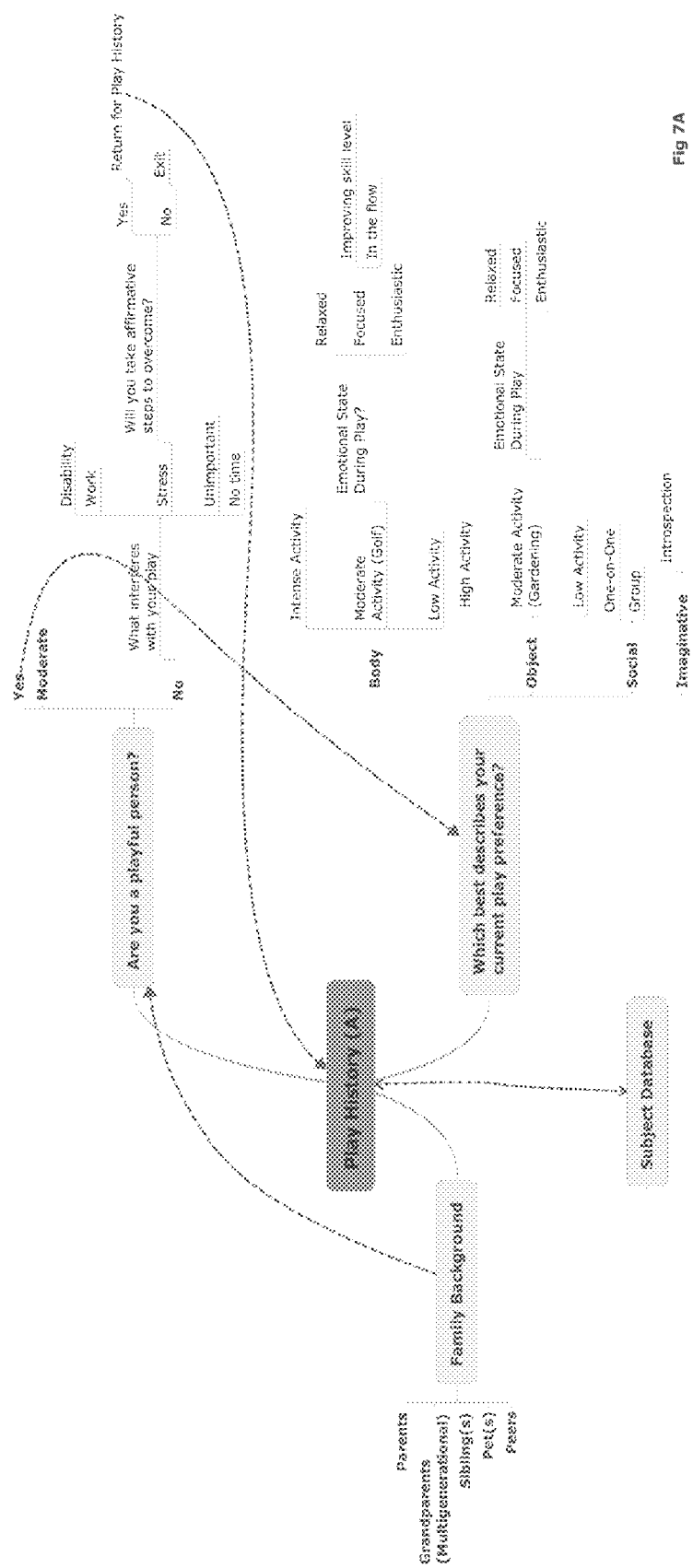

In one embodiment, determining play personality of a person begins with presenting a questionnaire, such as the ones illustrated in FIG. 6 and FIGS. 7A and 7B, to the person. The questionnaires can be administered by a trained clinician or may be completed by the user herself. When administered by one of ordinary skill in the art, that artisan may elaborate on the range of questions or may, guided by the principles set forth herein, use follow-up questions to draw out further details. The system and methodology works well from either approach—self-guided or administered.

Instead of or in addition to a manually administered questionnaire, play personality may be determined automatically based on information collected by a computerized system. In the simplest case, the system may electronically display a questionnaire, receive the answers to the questionnaire through user input, analyze the answers based, at least in part, on the information in the Historical Database, and thereby automatically determine the play personality of the user.

In more complex embodiments described hereafter, the automated determination of a person's play personality may involve deriving information about the person in ways that are much subtler than presenting a questionnaire. For example, information about the person's play personality may be derived from the user's conduct during an online game. As another example, a game may be designed in such a way as to elicit from the user, through interaction with game elements, non-playing characters, and the avatars of other users, the information that would otherwise be obtained with the questionnaire.

Obtaining Demographic Information

FIG. 6 elicits basic background information on the subject concerning her demographics. There are differences to be observed, sometimes subtle and sometimes overt, depending on such background factors as sex, religion, cultural heritage and age. For example, males play somewhat differently than females and this difference changes over different age ranges. Likewise, some cultures are more or less hospitable to play and the state of play it induces. One's geographic location may tend to augur for more or less play in or around nature if a person resides in a rural environment while urban dwellers may skew to different play types due to environmental constraints.

Regardless, the demographic data such as that illustrated in FIG. 6 is collected and stored in a Subject Database depicted in FIG. 7A. Preferably, this data is also collected and used to update the Historical Database either automatically or at a predetermined time when similar data is uploaded to increase the breadth of data housed therein, thereby conferring on the system a greater range of data when deployed in a subsequent enquiry by a later user or subject.

Obtaining Play History Information

The subject interview continues with a Play History questionnaire shown in FIGS. 7A and 7B. The questionnaire, as with the demographics enquiry of FIG. 6, can be administered by a professional or can be user inputted as she is led through the questionnaire under the guidance of control software in the system of the present invention. FIGS. 7A and 7B set forth a series of sample questions to which the subject/user responds. It begins with family background to complement the demographics previously collected. The family background questions, though demographic in general, are more directly relevant to the person's play history so those answers are collected more specifically than generally. In addition to learning whether the subject/user has a (multigenerational) nuclear family, the questionnaire elicits at least brief details about the play tendencies of those individuals as well, and whether parents/grandparents/uncles/aunts or other adult figures either encouraged, discouraged or participated in the subject's play as a child, juvenile or adult. The presence of pets in a household, and especially animated pets, can influence a person's play tendencies and types. Play with peers at all stages of development also impacts a person's play personality and play tendencies.

The questionnaire, still aided by software, leads the subject through a series of questions, illustrative ones of which are depicted in the figures. These questions range from the general to the specific. For example, as a general question, the subject is prompted to answer whether he considers himself a playful person. After the general prompt, depending on the answer, the pattern flows into a series of more specific questions concerning either preferred play types, some of which are shown in the figure and drawn from the Play Types identified in FIG. 1 or, if answered in the negative, extracts information concerning impediments to play. The user can answer using radio buttons or other conventional means where he can use a mouse and click on one or another of a set of possible responses. There are also places for the user to enter narrative answers as well at each stage of the interrogation process. More specifically, a comment box will appear in a conventional manner as each set of questions is answered by clicking on an associated radio button. For example, if the user indicates he is a playful person, a comment box will appear with the heading "Why do you say that?" Having filled in that comment, the user is directed to a set of alternatives which parallel a variety of play types, only a few of which are shown in FIG. 7B. Once again the user is prompted to indicate the play types he prefers. Comment boxes are provided to allow the choices to be weighted and other comment boxes appear to elicit basic information on why each play type was selected and why others were not.

The questions of a play questionnaire strive to elicit from the user or subject a range of information that involves attunement, temperament and specific play activities over his/her lifetime (data may also be derived from a game). For example, there are questions dealing with family history that delve deeper into the person's interactions with family members when s/he was an infant and young child. Answers to these questions help establish the important background on attunement. Other questions probe family life and culture. With answers to such questions, one's temperament can be ascertained and, as will be seen below, can be developed through playful interactions and activities. There are also specific questions dealing with the person's own play history, what s/he liked or didn't, those play types that the person found most engaging, and the like. Those skilled in the art, guided by the principles set forth herein, can readily devise their own questionnaires (or games), provided the process address the topics of attunement, temperament and play throughout or at present within the subject's or user's lifetime.

Answers may be recorded in any of a number of convenient ways, whether the questionnaire is administered by a clinician or self-administered by the user. For example, answers may be recorded in a coded form where a separate field is provided for each question, such as a field 77 in which to record the answer to question 77. The field may be textual and the answer analyzed using key words. The field may be oral, so that the user or subject vocalizes answers and speech recognition software employed to correlate answers with data in the Historical Database. Alternatively, each question may be broken down into its component elements and radio buttons provided so the user or administrator can simply use mouse clicks to record the essential elements for each answer.

The manner in which answers are drawn from the subject or user is of much less importance than the data itself. Data can just as effectively be collected through a game and/or body/facial decoding software as through an explicit questionnaire. Such data can represent the individual's entire play history and its foundations in attunement and temperament.

Data from the subject or user is collected and used in two specific ways. First, this data populates a Subject Database representative of the individual's play history in all of its relevant aspects. Second, this data is transmitted to the Historical Database to update its contents with additional statistical information, thereby continuously enriching the content used for later analyses.

Upon completion, system software makes a comparison of the data in the Subject Database to the data in the Historical Database. Comparison software may easily be written or obtained commercially. For example, data in the Subject Database concerning attunement is compared with data in the Historical Database concerning attunement and an attunement profile is developed. The subject's answers may indicate strong bonds with her mother and corresponding data in the Historical Database will correlate with that data. Alternatively, the subject may have suffered some form of abuse and the corresponding data in the Subject Database will correlate with anti-attunement data to be reported. Play types and intensities in the Subject Database will draw from the Historical Database the corresponding data housed in the latter.

Play Personality Determination Example

According to one embodiment, determining a person's play personality involves:

1. Establish basics—Age, gender, religion, educational status current/past employment history, marital status, brief family background, i.e., siblings, cultural heritage, geographic locales.

Questions that may be used to obtain this information include: A. What is your earliest memory of playing as a child? B. Were you an only child, or were there siblings? How many, what genders?

2. Obtain primal elements of play personality from early childhood data. Can usually retrieve sufficient data from this emphasis to show proclivities for one or more of the basic patterns of play, i.e, body, object, social, imaginative, ritual, games, etc. and relative degree of adequacy or early deprivation.

If major deprivation or full play amnesia exists, a potential decision tree might move the questions away from further play narrative development and proceed to current adult play activities. Questions to obtain other primal elements of play personality include: A. What were the ways you played in elementary school (grades 1-4?) B. Did you have playmates—adults, children, pets?

3. Develop early life individual play narrative to assess if primal patterns from childhood were or were not enriched, developed or thwarted. If entirely novel or new patterns emerge, they should be included as contributory to basic play personality that is naturally becoming more complex.

This narrative generally proceeds through sequential questioning from late elementary through middle school and adolescent years. Individual preferences tend to be sustained though modified by family, cultural, gender and situational variations.

Questions to obtain early life individual play narrative include: A. Did your parents or caregivers allow you to play as you liked? B. Was your playtime structured? By whom?

4. Establish intrinsic and potentially acquired outline of current adult play personality. What in life now fulfills some of the basic criteria that constitute authentic play? Are they in alignment with current vocational heritage, or do they align with the current job description? Work-play separation or integration? Leisure choices, friendship patterns, romantic-marital choices, games, ritual (birthdays, holidays, etc) play choices. Questions to obtain this information include:

A. What do you like to do that is pleasurable when you are not working? B. What do you like most about your work? C. What do you wish you could spend more time doing?

5. Integration of play narrative with prior or current vocational choices. Does the current or past vocational history align with what has been demonstrated as the major elements of the underlying play personality? Questions to obtain this information include:

A. Does your play today resemble your play of earlier years? B. Do you feel you play enough? C. Does your work get in the way of your play? D. How often do you play?

Automated Collection of Play Personality Information

In the example given above, the information used to determine the play personality of a person is obtained using a questionnaire, which may be executed in-person. However, in alternative embodiments, the play personality of individuals is determined based on actions, taken by the individuals, that are captured by a computer system.

Examples of actions that can automatically be captured include, but are not limited to:

the type of items that are purchased online (gardening tools or a Rubik's cube may, for example, indicate someone who enjoys object play)

a user's responses to an online questionnaire;

a user's narrative, physical and/or physiological responses to content in an online environment, whether or not such responses are consciously made (e.g. captured voice, sensor-detected motions, sensor-detected dilation of pupils, etc.)

the actions taken by a user within a game environment (frequent use of "chat" may indicate someone oriented to social play, while spending a significant amount of time exploring a virtual world may indicate someone oriented to "exploratory" play)

the type of computer programs downloaded and/or used by a user (computer-aided design programs indicate enjoyment of object play, while electronic versions of a board game indicate enjoyment of game play)

the topics/content reflected in the electronic communications (email, texting, instant messages) of a user the topics/content reflected in books purchased online by users topics/content reflected in web sites visited by users the online social communities to which users belong interests reflected in comments made by users in online social applications the persons to whom a particular user is socially connected in online social applications Automatically Determining a Baseline Irrespective of the tactical manner in which the skilled artisan chooses to make the comparisons between the Subject Database and the Historical Database, the intersection of the two sets of data defines the baseline for determining the play personality and play quotient of the subject. Once the baseline is established, which is the locus of both the play personality and play quotient, the user or subject may refine those results with further feedback.

A fundamentally important output within a person's baseline is any evidence or suggestion of play deprivation or play suppression either as an ongoing trait or an historical one. Play deprivation can lead to severe antisocial and other dysfunctional behavioral patterns in a person's life, including a tendency for violent manifestations as has been observed by the present inventor in his studies of mass murders. Of course, not all play deprived people are destined for a life of violence but the obverse is equally true—those with healthy play personalities are much less likely to resort to violence when confronted with a serious problem or conflict. As previously noted, play deprivation or serious play suppression is a catalyst for depression and this too is not prevalent in persons with a healthy play profile or personality.

When serious play deprivation is discerned as an historical issue in a person's profile, it can manifest itself in either or both the attunement and temperament spheres of the individual's play history, and such deprivation is also reflected in a resultant constricted play personality. Identifying specific developmentally absent or later in life suppression of play experiences allows the participant to establish awareness of the specifics of his/her deficiencies. This level of specificity offers the play-deficient participant remediation descriptions that fit the deficiency, and offer improvements in health and well-being that are the proven results of improved play hygiene. The persistence of major play deficiencies can be demonstrated to result in psychosocial dysfunction. Thus this invention provides a methodology for detecting and remediating major play deficiency.

Play Quotients

The play quotient is computed much like a person's IQ. Because the Historical Database contains data which is updated as more people use the system, as that data is accumulated over time a user's or subject's activity profile may be compared with those of all other users and subjects where the average is normalized, for example, to a score of 100. A play quotient gives a person using the present system a simple way to keep track of where he stands and whether he is experiencing a state of play deprivation that can lead to negative consequences, not the least of which is depression as is known from the literature discussed above. In that event, he knows how important it is to increase the playful activities in his daily life and can proactively manage this aspect of his mental and physical health. The baseline further enables other lifestyle actions once it is known to the user or subject.

How engaging in a play activity affects a person's play quotient is based, at least in part, on the person's play personality. For example, assume that a person's play personality has a weight of 0.1 for narrative play, and 0.9 for rough and tumble play. Such a person would derive little satisfaction from narrative play, and significant satisfaction from rough and tumble play. Consequently, if such a person regularly engages in narrative play, that person's play quotient would increase only slightly, if at all (unless reading a narrative about rough and tumble play, such as a sports event, may heighten the score). On the other hand, if that person engages regularly in rough and tumble play, that person's play quotient would increase significantly. Thus, a low play quotient does not necessarily indicate that a person is not engaging in a sufficient amount of play activities. Rather, it indicates that the person is not engaging in a sufficient amount of activities that satisfy that particular person's play needs.

Process of Selecting an Option Based on Play Personality

Figure 8:
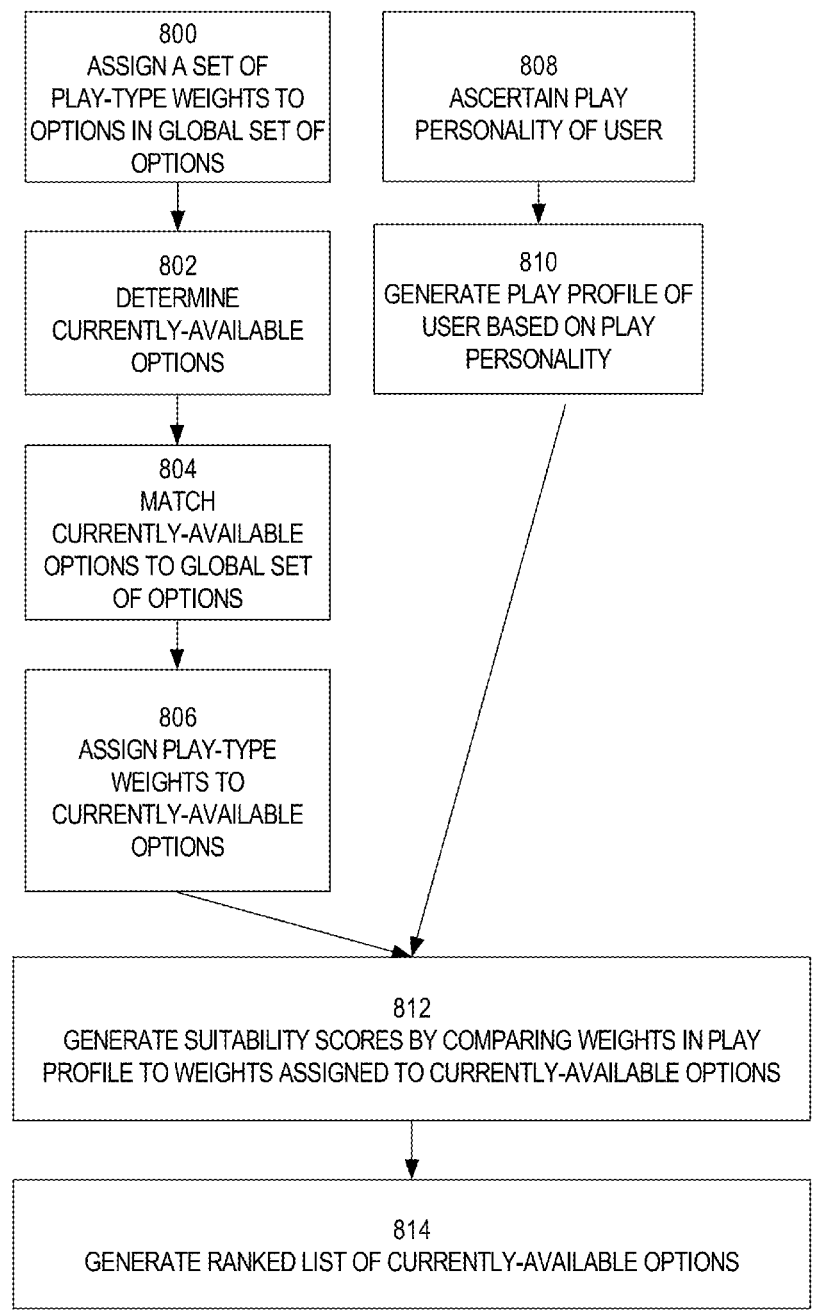
FIG. 8 is a flowchart that illustrates use of play personality in generating a ranked list of available options, according to an embodiment.

Referring to FIG. 8, it is a flowchart illustrating steps for selecting an option, from multiple available options, based on play personality of a group or individual. The flowchart illustrated in FIG. 8 is applicable to any context in which play personality is a factor in selecting among available options. Those contexts are virtually limitless. For the purpose of illustration, the steps of FIG. 8 shall be described with reference to the specific context of a job-seeker selecting among job opportunities.

Referring to FIG. 8, at step 800 each option, from the global set of options, is associated with a set of play-type weights. The global set of options generally refers to the set of all possible options of the type at issue, even though some of those options may not always be available. For example, in the context of selecting among job opportunities, the global set of options may be all types of jobs. Thus, step 800 would involve assigning a set of play-type weights to each of potentially thousands of job types.

In one embodiment, the step of assigning a set of play-type weights to option is performed by people that are familiar with both the meaning of the play types and the nature of the options. For example, in the context of job opportunities, the assignment may be performed by someone familiar with both the meaning of the play types and the requirements of the various jobs. Such a person may, for example, assign the job of garbage collection with the following weights:

object 0.9
pretend 0.3
social 0.2
rough and tumble 0.7
body 0.8
exploratory 0.3
celebratory 0.4
competitive 0.7
ritual 0.2
fantasy 0.1
narrative 0.1
games/gaming 0.1

On the other hand, such a person may assign the job of dental assistant with the following weights:

object 0.9
pretend 0.3
social 0.2
rough and tumble 0.6
body 0.5
exploratory 0.8 (they like to hunt for cavities, plaque, etc,)
celebratory 0.4
competitive 0.7
ritual 0.2
fantasy 0.1
narrative 0.4
games/gaming 0.3

In some circumstances, not all options in the global set of options may be available. For example, assume that the global set of options is "all possible job positions". At any given time, there may be job openings for some job positions, but no job openings for other job positions. Consequently, the set of currently-available options (the set of job positions for which there are opening) may be a relatively small subset of the global set of options (the set of all possible job positions). To account for the fact that some options in the global options may not be available, in step 802, the currently-available options are determined. How the currently-available options are determined may vary based on context. For example, in the context of job options, the set of currently-available options may be determined by electronically gathering data from one or more online job listing services. The data thus gathered may indicate the job categories for which openings are currently being advertised.

In step 804, the currently-available options are compared to the global set of options to find matches. For example, a current job opening for a janitor position would match the "janitor" job type in the global set of job types. In this example, there is a one-to-one relationship between the job opening and the global job type. However, in other situations, a job opening may map to several different global job types.

In step 806, play-type weights are assigned to the currently-available options based on the global option(s) that they matched. In the case where a job opening matched exactly one global job type, the job opening may be assigned the play-type weights of that global job type. In situations where the job opening matches multiple global job types, the play-type weights that are assigned to the job opening may be derived by combining the play-type weights of the multiple global job types to which it matched. Further, when combining the play-type weights, one global job type may be given more weight than another.

For example, assume that a job opening (JO1) matches both a first job type (JT1) and a second job type (JT2). However, the match between JO1 and JT1 may be strong (e.g. 0.9), while the match between JO1 and JT2 may be weaker (e.g. 0.6). Consequently, when combining the weights of JT1 and JT2 to determine the weights to assign JO1, the weights of JT1 may be given more weight than the weights of JT2. For example, the object weight assigned to JO1 may be ((object weight of JT1)(0.9/1.5)+(object weight of JT2)(0.6/1.5))/2.

Once the currently-available options have been assigned weights based on the global option(s) that they match, those weights are compared to the weights in the play profile of the person for whom one of the options is to be selected (step 812). Prior to this step, the play personality of the user is ascertained (step 808), and then recorded electronically in a play profile for the user (step 810). As explained elsewhere, there are numerous ways in which the play personality of a user may be ascertained, either manually, automatically, or a combination thereof. The techniques described herein are not limited to any particular way of ascertaining the play personality of users.

Based on the comparisons performed at step 812, a suitability score is generated for each currently-available option. The closer the match between (a) the weights assigned to a currently-available option and (b) the weights reflected in the play profile of the user, the higher the suitability score for that currently-available option.

At step 814, a ranked list of currently-available options is presented to the user. In the context of a job seeker, the job seeker may be presented with a ranked list of advertised job openings, where the higher-ranked job openings have been determined to be more compatible with the play personality of the job seeker.

In the example given in FIG. 8, compatibility with the play profile of a user is the only factor in ranking the list of available options. However, in alternative embodiments, compatibility with a play profile may merely be one of many factors involved in ranking the options. For example, in the context of a job-seeker, the job-seeker may also indicate a salary range and a preferred location. Those additional factors are taken into account, in addition to the suitability score, when ranking the list of job openings to present to the user.

Examples of Contexts for Selecting an Option Based on Play Personality

In the example given above, the play personality of a job seeker is used as a factor in selecting which current job openings are best suited for the job seeker. This is merely one example of a context in which the steps illustrated in FIG. 8 may be applied. The contexts in which play personality may be beneficially used to select among options are virtually limitless, and include, without limitation, at least the following:

1. Gamification: Automatically integrating play personality into game design into what have been traditionally non-game contexts and environments in order to playfully inspire user/subject behaviors, improve their experience and outcomes.

2. Aged care: Automatically selecting a content item for dementia rehab (or simple engagement with life) based on the play type that is needed by a particular aged person or aged group.

3. Human resources: Automatically matching employment applicant to the type of jobs that they might need/want/enjoy. Matching job specifications to applicant play type.

4. Gaming: Automatically matching gaming curriculum to the play type. Individual and customized player-designed game automatically self-developing through inputs via player-type.

5. Leisure and recreation: Automatically selecting among numerous locations, amenities and activities and matching play type to available locations and/or activities. Customized Club Med for Play Types. Travel itineraries, cruise lines, Parks, Disneyland, etc 6. Relationships: automatically selecting and matching play types between people (and people and pets - - - how to select a good pet: dog people, cat people, bird people, reptiles, etc) and suggestion of possible "date" activities, and relationship enhancement curriculum.

7. Retail: automatically matching play types to merchandize and services. For example, an online retailer may determine which sales to highlight, or which discounts to offer, based on the play personality reflected in a user's play profile.

8. Health and well-being: selecting and matching preventative activities/therapies based upon play types. Obesity, diabetes, depression, OCD etc 9. Parenting: matching parenting behaviors and activities designed for deep engagement based on play types.

10. Finance: matching play type to a curriculum of saving and investing based on play type. Retirement planning based on play type.

11. Innovation: identifying and matching play type to proclivity to innovate in particular ways and in particular areas. Play drives innovation. Curriculum for self recreation after mid-life crisis. Personal Growth curriculum.

12. Play deficit: identify and assess play quotient/play deficit.

13: ADHD: matching play type to activity to reduce symptoms of mild to moderate ADHD. (1 in 10 children identified ADHD in US alone) New supplemental curriculum for ADHD children.

14. Spirituality: Playing with God, building deep spiritual engagement through play type. Developing meaning and purpose in life - - - How to play with negativity, build bridges, tolerance, compassion based on play type.

15. Personal Growth. Matching play type to personal growth curriculum. Character Development, Ethical development, compassion, empathy and moral development. Leadership Development. Play is self-sustaining and inherently motivating—wired into us to produce joy and "happiness" ergo life contentment.

16. Aging and play type. Aging with grace playfully through play type curriculum/activities.

17. Play personalities of pets. A person can assess the play personality of a potential pet to see if the pet is desirable. After assessing the play personality of a pet, the pet's owner may use the play personality as a factor in selecting among possible activities of the pet. In addition, the play personality of two animals may be compared as used as a factor in determining whether the two animals would play well together.

18. What pet or breed of pet fits best with your play personality. The "options" may correspond to breeds of dogs, and the steps outlined in FIG. 8 may be used to select the breed of dog is most suitable for the play personality of someone that is considering purchasing a dog. Alternatively, the "options" may correspond to all possible pet choices, from horse to dog to frog, and the steps outlined in FIG. 8 may be used to select the species that is most suitable for a particular user to have as a pet.

19. Avatars and gaming: what is the Play Personality of your avatar? Avatars can ask questions to other avatars, thereby gathering the information necessary to determine the play personality of game players. There is growing evidence avatars are a psychological/biological extension of the fundamental play personality.

20. Interview questions do not need to be sequential from broad to specific, building on each other. They can be integrated randomly into a game and asked by an avatar while the person is playing without suspecting he/she is being interviewed and the software is gathering play info. In such a manner, the affective shield of the gamer may even be lower and the game design software may gather more authentic information from the gamer so as to develop a play personality for the gamer that the gaming software can use to develop around and customize within self-generated games. This could be an on-going integrated assessment within game design as play personalities do change over time.

Gamification

Gamification differs from gaming in that gamification is the integration of game design elements within what has been traditionally a non-gaming context or environment such as health or education. The development of gamification applications using the intrinsic play personality of the user/subject in the game design in non-game contexts and environments can playfully induce enhanced user/subject engagement, experience and outcomes currently lacking with purely extrinsic motivational game dynamics. It is estimated by marketing research that gamification will become a $5.5 Billion industry by 2018, and that by 2015 50% of organizations will gamify innovation processes. While many see explosive growth, Gartner Research predicted in 2012 that 80% of gamification applications would fail by 2014 to reach business objectives due to poor design. Glaring design flaws cited by Gartner included a lack of meaningful engagement and "player-centric" design, and an over-use of extrinsic reward systems.

When the individual play personality is integrated within gamification (as opposed to gaming quests), the user can employ knowledge of their own biological design to play to reach real-world solutions for themselves or a group: better health, nutrition, exercise, or learning or happiness/joy, relationships etc. By identifying, integrating and designing from the player's play personality and intrinsic motivators, game design can thus become "player-centric" and not simply a one-size-fits-all game design relying on extrinsic carrot-stick reward systems. Without binding the user to a shortsighted task that needs to be accomplished for a badge or extrinsic reward, the user utilizes play personalities (his own and others) within gamification design to develop and actualize deeper, longer lasting solutions and behavioral changes.

Play-Type-Specific Change Report

As an example, suppose User 1 is informed by the system of the present invention that he expends 8% of his active time each week engaged principally in Competitive Play, Fantasy Play and Gaming Play, split approximately equally across the three play types. Given that baseline, User 1 determines he would like to increase his overall play time to 10%, deemphasize Fantasy Play and add Object Play. Though these choices may be recorded on paper, preferably User 1 maintains a log on his mobile device and adds notes each time he engages in a play routine. After a period of a few weeks, User 1 updates his play history with the new data and a comparison is made with the Historical Database and his prior Subject Database and a new report is generated showing any deviation from the previous report, allowing User 1 to observe empirically how his play patterns may have changed and further allowing him to continue or modify the schedule he adopted earlier. Updating the play history may be accomplished, at the user's desire or preference, establishing a "Bluetooth" connection between his mobile device and computer and that can be accomplished conveniently whenever the two are paired.

Automated Identification of Play-Type-Specific Sources

As a further example, suppose User 1 determines that he is still lower than he wishes in the category of Object Play. Using the presence sensing (GPS) feature of his mobile device, he sets an alarm for the types of Object Play that suits his play personality. As he has time to devote to play experiences, User 1 activates his mobile device and through its mapping features he is advised that there is a bowling alley eight blocks from his current location and a golf course three miles away.

In this example, the mobile device is able to determine that both bowling alleys and golf courses are associated with Object Play. According to one embodiment, this determination is possible by electronically storing certain mappings.

For example, one such mapping may be a mapping between play types and activities. In the play-type-to-activity mapping, object play may be mapped to both the activity of bowling and the activity of golfing.

In addition to the play-type-to-activity mapping, there may be a mapping of place categories to activities. In this example, a place category is a type of place, such as library, park, bowling alley, amusement park or golf course. The place-category-to-activity mapping indicates what types of activities are generally available at certain place categories. For example, in the place-category-to-activity mapping, "library" may map to "reading", "bowling alley" may map to both "bowling" and "arcade games", "golf course" may map to both "golfing" and "card playing", etc.

Finally, there may be a third mapping that maps actual sites to the place categories to which they belong. For example, the site-to-place-category mapping may map "Joe's Bowling Alley" to the category "bowling alley", and the "Evergreen Library" to the category "library".

Based on these three mappings, a mobile device may be programmed to:
use its GPS to identify actual sites in the vicinity of the user
for each of those sites, determine the play type available at the site by
determining the site category of the site based on the site-to-place-category mapping
determine the activities available at the site based on the place-category-to-activity mapping, and
determine the play types available at the site based on the play-type-to-activity mapping
filter the sites based on the play type available to leave only those sites that offer the play type needed by the user
Once filtered, the mobile device may present those sites in a ranking that is based on proximity to the user and/or based on how strongly the site is tied to the play type desired by the user.

Automated Identification of Play Needs

As previously mentioned, computing mechanisms may be used to automatically obtain the information from which a user's play personality is derived. In addition, computing devices may be used to automatically obtain information about the user's activities and, based on this information, determine whether the user is deficient in any particular type of play.

For example, assume that a user uses a mobile phone to "check in" to places the user visits. Based on the user's check in data, the mobile device may determine how frequently the user visits the gym, visits the bowling alley, etc. If the user's play personality gives a high weight to object play, and the mobile device detects, based on the check in data, that the user has not visited any site at which object play is generally available, then the mobile device may generate an alert to encourage the user to engage in object play.

This feature of automatically detecting possible deficiencies in play may be combined with the automatic identification of play-type-specific sources, described above. In an embodiment that combines these features, the mobile device may not only alert the user to the fact that the user may need more object play, but may also suggest to the user those locations, in the current vicinity of the user, at which object play is available.

Play Types and Social Media

The present invention is ideally suited for social networking as well. For example, User 2 is a Facebook participant and has joined a group of likeminded people on a page devoted to Social Play. Augmenting the Facebook group, she is a member of a circle of friends interested in play activities, in this example Exploratory Play. Using these social networking capabilities, User 2 may be informed of opportunities to engage in her preferred play types, make appointments for play opportunities and remain informed of the play activities of those others in her social circles. Moreover, these social networking environments can foster support groups which encourage members to maintain a healthy play lifestyle.

Recording Activities

The system of the present invention may be integrated with or into other systems that monitor activities of a user and record data relevant thereto. One example of an activity monitoring system is that disclosed in U.S. Pat. No. 8,463,577 issued Jun. 11, 2013 and sold under the trademark of Fitbit®.

Whether or not associated with an activity monitor, the system of the present invention chronicles the play activities of a user who chooses to record play activities on a periodic basis such as daily or weekly. Tracking the play type, such as object play, the duration and any other pertinent notes, the user may observe her play proclivities, those to which she tends to gravitate, others with whom she plays, how often and how long. These play activities can be displayed graphically by the present system so the user can monitor her play history on an ongoing basis and make such changes as she might desire as for example the mix of play types, the frequency of play activities and others with whom she does or desires to play. Having one's play personality displayed visually provides a ready way to observe her activities and can provide an extra incentive for more play or playful activities.

Using Play Personality to Select Types of Play Dates

Parents can also take advantage of the system and methodology of the present invention when setting up so-called "play dates" for their children. Though a young child is still early in the play development cycle, parents may chronicle their children's play activities and note those in which the child engages with joyful expressions and those less fulfilling. These notations may include the demographics of other children with whom their child plays and the types of play they gravitate toward over a given play period. A child's play talents are also likely to emerge at a relatively early age and an alert parent can identify and help actualize these developments as well. Then the parent can establish a Subject Database for each child and maintain a healthy awareness for their children's play profiles and development.

Parents and especially parents of young children, learn the rudiments of early temperament and attunement as they begin to foster the emerging play personalities of their children. Comparing their own play personalities with the developing play instincts of their children allows parents to mentor their offspring and establish healthy play activities for their children as a complement to their social and educational goals. As noted above, the instant system also permits parents to gauge activities based on gender differences and personal interests as well and to aid in the developing interests of their children as they mature to juveniles and later as young adults. Monitoring their children's play histories periodically informs parents of the play evolution of their children.

The preceding examples illustrate ways in which self-actualizing individuals may benefit from the system and methodology of the present invention. There are other applications as well. A few such applications are summarized below. Those skilled in the art will readily recognize that these are merely exemplary of the breadth of applications of the present invention and are not meant to be an exhaustive catalog. Accordingly, those skilled artisans will appreciate how these same principles may be applied elsewhere with equal efficacy and benefits.

Using Play Personality to Improve Education

Educators likewise will find useful applications for the system of the present invention. For example, in addition to the usefulness of the system for parents, educators may use the methodology described herein for curriculum development for students based on the identification of play-based talents and proclivities revealed by play histories and the determination of play personalities. By identifying the innate play talents of children through their play personalities and then developing curriculum to capitalize upon them, educators can deeply engage student learning in a way that is meaningful to them. Play is inherently self sustaining and self motivating and education needs to spark the flame of learning within each child. This is the essence of individualized education and taps into a learner's intrinsic motivators many are beginning to discuss.

Further, by determining the play personalities of teachers, deeper engagement, learning and academic outcomes of students can be facilitated. For example, the teacher-to-student assignment may be made based, at least in part, on the match between the teacher's play profile and the student's play profile. As a result, a class that includes primarily object play oriented students may be taught by an object play oriented teacher, while a class that includes primarily narrative play students may be taught by a narrative play oriented teacher. In such classes, both teacher and student are more likely to become more fully engaged when they adopt teaching methods consistent with their play type.

Even in classes that are not established based on the play personalities of their members, the students within a class may be divided into groups based on play personality. Such groups may have taught the same concepts in different ways, where the manner in which they are taught concepts is based on the play types they find most fulfilling.

Using Play Personality to Improve well Being of Elderly

The elderly and those who work with them as, for example, in assisted living quarters benefit as much as any from active play. In addition to aiding in physical wellbeing, many play types are thought to lessen vulnerability to diseases of the mind due to the improvement in neuronal redevelopment associated with robust play. Play personality identification for each elderly person can become the basis of an individualized curriculum to enhance deep engagement and compassionate care. As the cognitive capacities of the elderly decline, joy and deep engagement with life and others can be accessed pre-cognitively through play.

Using Play Personality to Help Establish, Heal and Build Relationships and Community and Resolve Conflict Those in or establishing an interpersonal relationship will find play personalities to be an interesting and helpful way to ground that relationship in play. Much like the importance of core values to a successful relationship, at least some overlap in play personalities can enrich the relationship. When people are interested in developing a deeper bond, comparing their play personalities to find mutually interesting play types and then acting on that information can foster that result. The same generally applies to groups as to pairs of individuals where new friendships can be developed or existing ones strengthened. Deep meaningful mentoring relationships of all kinds can be similarly matched and managed through play personalities. Play is a human universal language and is not diminished by age, gender, race, ethnicity, cultural or other differences. Play handicapping is a language that bridges differences. Play is how people learn to deeply engage one another, resolve conflict and keep bullying in check and build community.

Using Play Personality to Help in Human Resource Decisions

Human resource professionals can find added insight into personnel placement when play personalities are taken into account. An activity profile and especially the temperament of a shy or introverted person may suggest he will perform better in certain work environments and the same is true of a person whose profile shows significant tendencies toward the kinesthete. Indeed, having an interviewee's play profile in advance can aid in structuring the interview itself. Employer access to talent can be fostered by aligning job descriptions with the individual play personality.

Along these lines, organizational development can benefit an understanding of the composite profile of the individuals in a functional sector and the corporation's own play profile.

As a specific example of how play personality may be used to assist in HR decisions, an example is given hereafter in which the suitability of two applicants for a particular job opening is made through play history-play personality assessment.

For the purpose of this example, assume that a major hospital within a large medical center looking for an ICU nurse-supervisor. The job requires a BS.RN degree, and previous ICU experience. The job is a for 40 hour 4-day week. Benefits include professional development, 3 week vacation, etc. The position offers excellent salary, but not much room for advancement.

Recruitment is often difficult beyond traditional floor nurse supervisory aptitudes as the ICU environment requires a very responsible stress resilient and intellectually capable licensed RN to fill the position. Burn-out is a major problem in ICU nurse attrition. HR knows that optimum match requires in addition to the physical and emotional resiliency, deep compassionate integrated professionalism combined with social skills and love of people and families in need are part of the job description.

Recommendations and past experience usually help limit applicant pool prior to the administration of the play personality tool, but do not profile the benefits of a healthy well-matched play personality. Given this background, assume that the two applicants are Betty and Maria.

Applicant—Betty.

33 years old, married, childless female, Catholic, BS-RN, with 3 years experience as floor nurse and 2 as ICU nurse in small hospital with limited salary and advancement. Eldest child of 6 siblings, (offers in written application that she intends to remain childless). Active with extended family in area. Settled in stable marriage. Solid references. Managerial skills stability and resiliency often flow from this profile (Mayo clinic data)

Applicant—Maria 40 years old BS RN, MS. Single, 10 years general ICU experience. Solid references. Recent geographic change, Only child, No religious preference. A common profile of a highly dedicated often single-minded professional nurse at the peak of her clinical powers.

In this example, both applicants pass the basics for the job, but how can the play personality review be useful for the HR dept. in hiring? Simplified example:

Questions:

1 (Primal Play Patterns)

What is your earliest memory of playing as a child?

Betty: "I was the eldest of 6 children, my earliest clear memory is how I usually organized them into games. My mother often put me in charge of those closest to me in age, and I loved being their playmate and "mom.""

Maria: "I was an only child and remember being on the floor with a favorite stuffed animal."

Betty preliminary finding: Innate preference for social play and the rudiments of the "director" play personality are shown.

Maria preliminary finding: preferences for object play and fantasy play are likely precursors to a less social and shy temperament usually leading to preference for more artistic play patterns.

The readiness and clarity of the answer by both Betty and Maria usually means that no major play deprivation occurred early.

The full questionnaire would add details such as those leading to descriptions of essential temperamental givens, remembered pets, birthday celebrations, favorite toys, early play memories associated with preschool, kindergarten and playground play, etc. All of which reinforce, lessen or add new dimensions to the above question.

2: (Early Play Patterns)

What were the ways you played in elementary school (grades 1-4?)

Betty: "Having brothers, I guess I was a tomboy, I loved to play tag at recess."

Maria: "I was a bit shy, but my best friend and I played hopscotch and jacks."

These answers reinforce the continuation of early play patterns, Betty, showing physicality and constitutional enjoyment of rough and tumble play. It generally is associated with the capacity for more nuanced handling of stressful demanding playground competition from which the roots of empathy arise.

Maria is showing more social play than her earlier answers. (so HR, if they have an opening for one with her play personality might assign her to an administrative detail oriented job that better matched her play personality). But from these responses the HR user could be alerted that early personality play preferences are likely to be lifetime and even these early developing play profiles can potentially provide guidance for personnel placement. If this or other early play questions cannot be answered, the likelihood of play deprivation or adult overcontrol or other play suppressive forces are likely to have been operative, and forced atrophy or displacement of intrinsic play patterns has occurred with compensatory behaviors resulting. This may thus lead the decision tree of automated questions in the direction of deprivational themes.

Using Play Personality to Help in Career Decisions

Similarly, career counseling is raised to a more effective level if the counselor can match a person's play profile with occupational choices. This type of counseling takes advantage of the inspiration of doing what one loves and that often evolves from her play personality.

Using Play Personality to Improve Health

Play science has been shown to complement therapy and especially drug therapy. As noted above, there is evidence, both scientific and anecdotal, that application of the proper play types can reduce and perhaps eliminate the need for drugs in the management of ADHD. The same is thought to be true when dealing with such other afflictions as depression, autism spectrum disorders, obesity and vulnerability to addictions and obsessive-compulsive disorders. Insofar as certain stages of diabetes are susceptible to alleviation from exercise as well as diet, incorporating a rigorous regimen of active play and monitoring a patient's play profile can be an effective adjuvant in the range of treatments. Moreover, recent studies in epigenetics indicate the integration of play into our everyday lives can prevent the activation of undesirable genetic predilections and diseases. The identification of the play personality and subsequent design of an individualized health curriculum has huge self-motivating and self-sustaining preventive applications, but can also apply to effective compassionate care as in the case of deep engagement with dementia patients who have lost cognitive abilities, but retain their pre-cognitive capacity to play.

Using Play Personality as a Factor in Online Games

As mentioned above, information about a user's play personality may be derived from the user's activity within a game. This information may be used instead of, or in conjunction with, play personality information obtain by questionnaires and/or interviews. The game-acquired personality information may include both information based on the actions performed in the game environment by the avatar of a user, and information directly communicated by the player while in the game. For example, at various points in a game, a player's avatar may interact with various non-playing characters (NPCs). During these interactions, the NPCs may be designed to present questions to the player. The player's answers to those questions may be used as one basis for determining the play personality of the player.

According to one embodiment, various aspects of an online game are dynamically modified based on the play personalities of the players of an online game. For example, the play personality of a player may affect, among other things, one or more of the following:

- the visual appearance of the player's avatar (e.g. different colors, outfits, sizes, shapes, etc. based on the player's play personality.
- the abilities afforded to the character based on the player's play personality. For example, the avatar of a "rough-and-tumble" player may be given a "wrestle" ability that is not otherwise available to players, while the avatar of a "fantasy" player may be given a "fly" ability that is not otherwise available to players. As another example, the avatar of "social" players may be granted a "long range communication" ability that is not automatically available to other players.
- the attributes of a player's avatar may be based on the player's play personality. For example, the avatar of an "exploratory" player may be given more stamina, to explore longer without resting. On the other hand, the avatar of a rough and tumble player may be given a higher toughness, to endure damage better.
- the actions of non-playing characters. For example, when interacting with the avatar of a "narrative" player, the non-playing character may give more details about the story line of a quest than they otherwise would if interacting with the avatar of a "rough and tumble" player. Similarly, non-playing characters may be designed to challenge the avatars of "competitive" players to competitions under circumstances where the avatars of other types of players would not receive the challenges.

Instead of or in addition to any of the above-listed effects, play personality may also affect the nature of activities presented by the game. For example, many online games involve going on "quests". Successfully completing a quest involves performing certain activities, such as collecting certain in-game items, or defeating an in-game villain. Rather than have a single version of each quest, a game may be designed with multiple versions of the quest, where each version corresponds to a different play type. Under these circumstances, the activities one user must perform to complete a given quest may be different than the activities that another user must perform to complete the same given quest, where the difference is due to a different in the play personalities of the users.

For example, a certain NPC may be designed to ask players to perform a quest. If the player that is asked to perform the quest is a "social" player, the NPC may ask the player to perform an act that involved interacting with other players, such as "join with three others to defeat a boss". If the player that is asked to perform the quest is a "competitive" player, the same NPC may ask the player race with other players to be the first to accomplish some task. If the player that is asked to perform the quest is an "object" player, the quest may be to build a structure (e.g. a house of blocks) within the game.

As another example of how an in-game environment may take into account the play type of players, the successful completion of a quest by a "celebratory" player may trigger the start of an extended victory sequence, such as a cut-scene animation or an in-game parade. On the other hand, the successful completion of the same quest by an exploratory player may trigger a much shorter and/or simpler victory sequence.

Doppelgangers

Similar to avatars, doppelgangers are virtual entities that represent a person. However, unlike avatars, the actions of doppelgangers are not directly controlled by the person they represent. Typically, in an online game, for example, a doppelganger's action is controlled by the game software, not the user represented by the doppelganger.

According to one embodiment, once a person's play personality has been determined by any means (e.g. through a physical questionnaire, an online questionnaire, monitored online activities, in-game interactions, etc.), that play personality may be used in conjunction with a doppelganger to produce a more engaging user experience. For example, after determining a person's play personality, the intrinsic motivators, the feelings that move the person into action, a doppelganger may be developed or automatically generated with those attributes. In addition to the play personality of the user, the doppelganger may visually reflect one or more visual characteristics of the user. For example, the doppelganger's face may be based on a scanned image of the face of the user. As another example, the gender, hair color, eye color, etc. of the doppelganger may be based on the gender, hair color and eye color of the user.

As a result of basing the doppelganger on the user's play personality, the doppelganger may thereby be infused with potentially greater powers to motivate and transform the participant's behaviors over time, leading to greater efficacy. Such play-personality-reflecting doppelgangers may be used in many contexts. For example, within an action game, the user's avatar may be required to battle the user's play-personality-reflecting doppelganger. In other contexts, the user's play-personality-reflecting doppelganger may be used to motivate the user to exercise more, eat better, or buy specific products. Under these circumstances, the type of exercise, type of food and/or type of product may be based, at least in part, on the user's play personality and corresponding intrinsic motivators.

Recommendation Systems

Numerous services monitor the online actions of users and then provide recommendations based on those actions. For example, online stores often monitor the purchases of users, and recommend additional items to the users based on the user's prior purchases. Such systems are described, for example, in U.S. Pat. No. 7,113,917 and U.S. Pat. No. 7,908,183.

The input upon which such systems base their recommendations tends to be objective and extrinsic, such as a user's overt behavior (e.g. prior purchases). However, overt behavior is not necessarily the best measure of what a user would enjoy. According to one embodiment, a user's "intrinsic motivators" are used in conjunction with, or instead of, overt behavior, as a basis for determining what the user would enjoy.

Intrinsic Motivators

According to one embodiment, techniques are provided for identifying and developing the intrinsic motivators of users. Play-based intrinsic motivators are biologically driven and subjectively experienced precognitively as emotions. By-products of a user's being true to their intrinsic motivators include, among other things, pleasure, sustained motivation, a sense of purpose and increased mastery. Unlike "push" advertising, where products are presented to a user based on the user's past overt behavior, "pull" advertising involves presenting products based on the product's ability to evoke engagement and/or develop the user's intrinsic motivators.

With respect to the development of intrinsic motivators, it is believed that the genesis and expression of selected intrinsic motivators comes from and through the biological drive to play. Intrinsic motivators identified through the myriad expressions of play are unique to the individual's composite play personality, inclusive of attunement, temperament, and the play drive to explore, caregive and mirror/model social behaviors. These intrinsic motivators can be used to empathically design, engage customers, and market. Unlike existing recommendation systems, a system that takes into account intrinsic motivators is not merely predicting future behavior based on past behavior, but rather predicting future behavior based on the aspirations of users. That is, the key is not what users have already done, but rather what the users aspire to. Numerous techniques are described herein for determining play personalities of individuals. From those play personalities, intrinsic motivators of the corresponding users may be derived. Once the intrinsic motivators of the users are determined there is clear guidance as to how such intrinsic motivator information can be used. For example, it is possible to collect/process intrinsic motivator data and sell it for applications in many sectors, e.g. "pull" advertising wishing to correlate the aspirations/intrinsic motivators of their clients to individualized marketing. As another example, a service may collect/process/maintain intrinsic motivator data for a fee, and then allow the individual to license their own data to the entities of their choosing.

The ability of a user to control and benefit from licensing the user's own intrinsic motivator information is revolutionary, as it puts the power and responsibility back on the individual as to how they want to interact with companies. This also puts companies on notice that aggressive push marketing may not be well received and if they want to deeply engage their potential customers they need to meet them in their most authentically motivated behaviors, and attuned with their aspirations. This changes marketing and customer engagement from being exclusively reliant on one-size-fits-all push marketing based on a client's past behaviors, and encourages and guides companies and services to custom design more empathically by engaging the customer's individual intrinsic motivators.

Clearly, using intrinsic motivators as a factor in determining a course of action or recommendation does not mean intrinsic motivators need be the only factors to consider. Extrinsic motivators influence behavior as well. However, over-using extrinsic carrot-stick motivators without taking into account intrinsic motivators can make people feel whipsawed, objectified, measured and quantified and not deeply seen for who they are and are becoming. Taking into account intrinsic motivators may, for example, change marketing for the better so it is driven not by conformity to external norms, fear, guilt, shame or lack in the customer, but by affirming the uniquely individualized emotionally satisfying choices that appeal to a grounded affirmation of "my real self".

The emotion from a type of stimulus (e.g., object, social or narrative) evokes and identifies the subcortical intrinsic motivation. An example of this would be hearing rhythmic music that is emotionally experienced as deeply engaging, and hence, inspires and produces bodily movement (dancing or body play). Another example is a person facing a disorganized workspace. Many people would not be bothered or moved by this. Yet a person who derives pleasure from organization will be emotionally moved or inspired to put things into some form of coherent order and derive emotional satisfaction with the new structure.

While all humans are biologically wired to be social animals and we are curious about one another and influenced by modeled behaviors, the character of the emotional motivation we individually experience differs between us and is influenced by our cultures, temperament, attunement and historical experiences.

Figure 10:
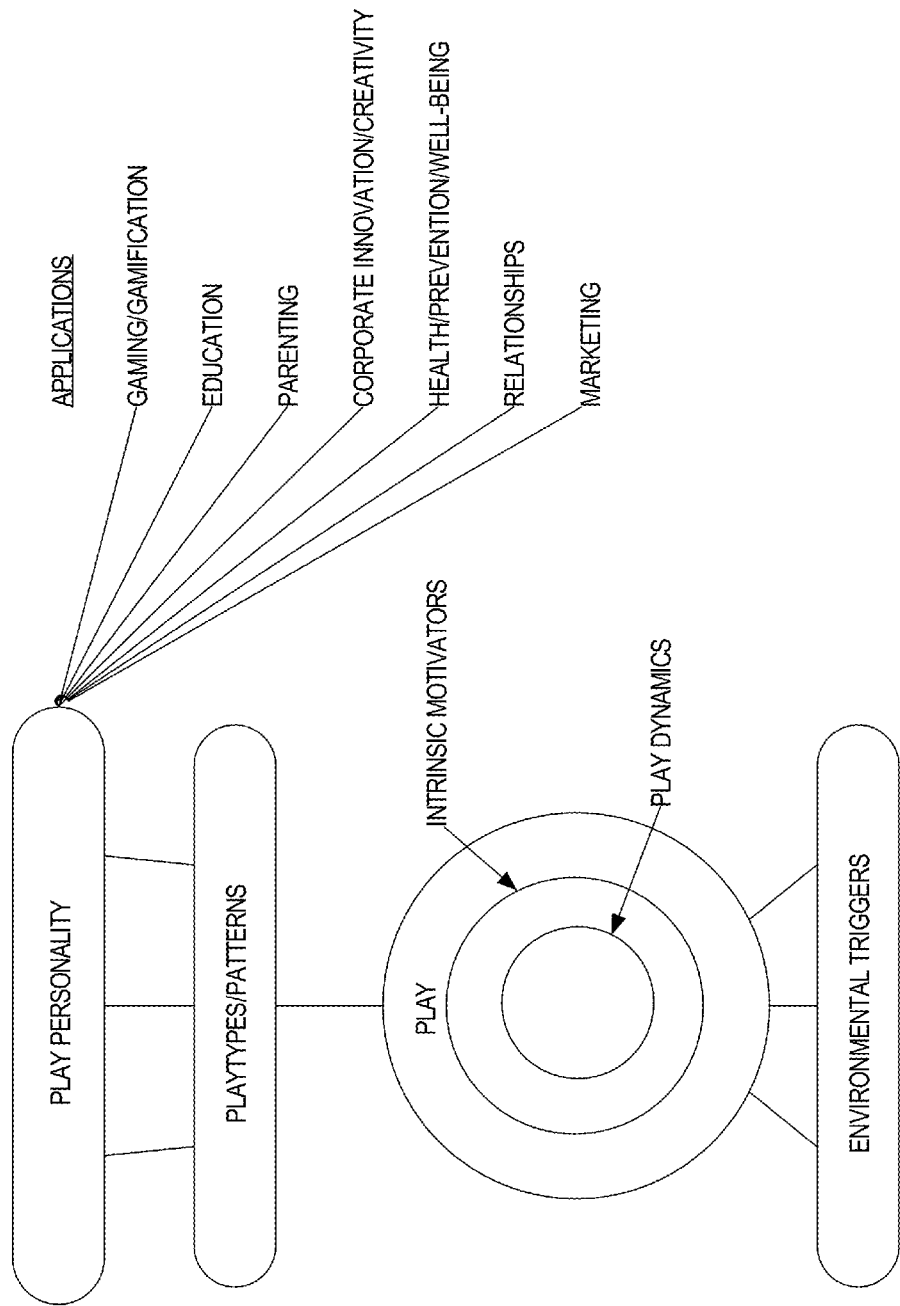
FIG. 10 illustrates that environmental triggers can activate the intrinsic motivators within the innate drive to play and the combination of play types and patterns, combined with play dynamics (FIG. 2), sculpt the individual play personality

While not all human intrinsic motivators are found within play types and patterns, the many intrinsic motivators within play types/patterns we can identify include but are not limited to the following examples. They comprise a pre-cognitive emotion and consequent behavior Desire, pleasure, satisfaction to tinker, construct, tear down, use tools—Object Play Desire, pleasure, satisfaction to chat, flirt, tease, joke around—Social Play Desire, pleasure, satisfaction to dance, jump, run, touch, tickle—Body Play Desire, pleasure, satisfaction to nurture pets, encourage a friend—Caregiving Play Desire, pleasure, satisfaction to risk, assemble and execute a plan, seek adventure—Exploratory Play Hence, as illustrated in FIG. 10, a person's play personality comprised of numerous weighted play types/patterns would contain corresponding intrinsic motivators, activated or latent, coupled within play dynamics. Identifying specific intrinsic motivators is facilitated through the play personality identification and actualization, and further nuanced and individuated by the individual's culture, temperament, attunement historical experiences and play dynamics.

By ascertaining the precognitive emotional charges that characterize a person, be they experienced, expressed or latent, we can begin to identify the intrinsic motivators that provide inspired nutrition for that person's complete engagement in the present and offer guidance for future thinking and behaviors. Precognitive emotional charges can motivate, guide and transform behaviors, and the environment can activate and sustain these behaviors through play. Identifying a person's intrinsic motivators through the composite play personality has myriad applications, from marketing, to education, personal health and well-being and more.

Chaos and Emergence

Chaos and emergence theory attempt to explain how patterns emerge from the realm of all possibilities, from chaos. Viewing chaos and emergence theory through the lens of play suggests that it is play which serves as the organizing system for chaos to emerge into patterns. The focus on play behavior as a pattern organizer which emerges from chaos is analogous to the paradox of quantum particle-wave function defining subatomic reality, or the poet-saints' timeless view of this being at its base, a playful universe. So in viewing human behavior overall, the emergence of play patterns and personalities evolve as self-organizing properties of the human psyche. In all social animals, including our species, self-organizing play patterns spontaneously emerge in infancy from subcortical areas through their play. Over time, those rudimentary play patterns become more sophisticated, refined and blended to become play personalities. Environment, through epigenetics, activates and sustains the innate play drive. Yet it is the identification and actualization of individual intrinsic motivators through their corresponding play personalities that transforms precognitive motivators into a cognitive understanding of the human design to play, create and innovate.

Group Play Personalities

Many of the examples given herein relate to the play personalities of individuals. However, when a decision is to be made relative to a group, the play personality of the group as a whole may be used as a factor in making the decision. A group play personality may be ascertained in a variety of ways. For example, a questionnaire may be presented to each member of the group, and the most frequently received answer may be treated as the group answer. Alternatively, a group play personality may be derived from the play personalities of the individual members. For example, the group play personality may have a weight for each play type that is the average of the weight, for that play type, from the play personalities of the individual members of the group.

Once a group play personality has been determined for a group, the group play personality may be used as a factor for making decisions that affect the group. For example, when determining how to teach a concept to a class of students, the play personality of the class may be used as a factor in determining how to teach the concept. As another example, the physical education teacher for an elementary school may select physical activities for each class based on the group play personality of each class. Thus, some classes may end up playing dodge-ball while other classes participate in gymnastics.

In the context of online games, it is common for games to have quests that must be performed by a group of players. In those cases, the game may automatically derive the group play personality of each group that initiates the quest, and customize the quest experience for each group based on the group play personality. For example, if the group play personality is heavily weighted to competitive play, then the quest may involve completing certain tasks within a given amount of time. On the other hand, if the group play personality is heavily weighted to object play, the quest may involve building an in-game item or solving a puzzle that requires spatial thinking.

As another example, the goal of a quest may be the same, but the environment in which the quest takes place may vary based on the group play personality of the group that is on the quest. For example, if the group play personality is exploratory, then the users may be put in an environment that requires avatars to spread out and explore to find hidden in-game items. On the other hand, if the group play personality is rough and tumble, then the users may be put in a smaller, enclosed environment where they obtain the needed in-game items by defeating monsters.

For an online game, all players of the game may be collectively treated as a group for the purpose of determining a group play personality. Upon determining the play personality of the group that includes all players, the developers of the online game may modify the game based on that play personality. For example, when deciding how to next expand the game, the developers may determine that the group play personality of all players is heavily "exploratory". Based on this information, the game developers may decide that the next expansion should involve adding additional territories, rather than adding new avatar powers. On the other hand, if the group play personality of all players is heavily social, then the next expansion may add additional mechanisms for grouping and/or engaging in inter-avatar communications.

3 Dimensional Game Systems

Computerized games include games played on desktop computers, hand-held devices, game consoles, etc. Historically, humans interact with computerized games by interacting with keyboards, game pads, joysticks, paddle controllers, etc. that were electronically coupled to the computing device that was executing the game software. In turn, the game typically provides feedback to humans in the form of a two-dimensional display of video, audio, and/or tactical feedback from the controls. With respect to the tactical feedback, some game controllers may, for example, vibrate in response to events that occur within the game.

As technology develops, alternative interfaces may be developed for the games to receive input from users, and for users to receive feedback from the game. For example, gaming systems have been developed in which a video camera captures video of a user, and translates the user's physical actions, captured by the camera, to game input that affects the game. Microsoft's Kinect technology is an example of computing systems may capture three-dimensional gestures without requiring direct manipulation of a keyboard, mouse, or game controller. Using such technology, a camera may detect that a user threw a punch, and in response the user's avatar, within a boxing game, may throw a punch.

In addition to detecting user's actions performed in real, three-dimensional space, gaming systems may generate visual output in three dimensions, rather than two. Three dimensional game output may be accomplished either by viewing a special image on two-dimension screen with special equipment, or by generating a holographic images.

According to one embodiment, the techniques described herein may be extended to make use of such 3-dimensional technologies. For example, facial expression recognition algorithms may be applied to the video input of a player that is captured while the user is playing a game. Based on the expression recognition, the system may determine the periods during which the user is smiling and/or concentrating, and the periods during which the user appears disinterested or bored. Based on the correlation between those periods and events that were occurring within the game, the gaming system may determine which types of in-game activities are most enjoyable to the user. This information may, in turn, be provided as input upon which the play profile of the user is determined.

The three-dimensional video output of a game may also include 3-dimensional play triggers to encourage the user to play the game. For example, a game may generate a hologram of a puppy bouncing back and forth with its eyes directed toward the potential player. For some users, this action may trigger the desire to play. According to one embodiment, the game selects the play trigger to present to a given user based on the play profile of the user. Thus, for a user that enjoys fantasy play, the game may display or project the image of a dragon flying through the clouds. On the other hand, for a user that enjoys object play, the game may display or project holographic objects with which the user may interact in real three-dimensional space.

Whether or not 3-dimensional input devices, such as video cameras that capture user actions, are used to gather information to identify the play profile of users, such devices may be used to identify the users themselves. For example, when a user turns on a game machine or begins playing a game on a machine that is already on, a video camera that is operatively coupled to the game machine may capture a picture of the user. The captured picture may then be compared with previously-stored pictures of users for whom play profiles have been generated. When a match is found, the play profile associated with the matching picture is used by the game to affect one or more aspects of the game. For example, assume that the face captured by the camera matches a previously-captured picture of a particular user, and the profile of that particular user indicates that the user enjoys exploratory play. Based on this information, the game may provide the user more opportunities to explore the virtual world than would be provided, for example, to a user that primarily enjoys competitive play.

Conflict Resolution through Engagement of Play Personalities

Evidence from author conducted research has demonstrated that seriously play deprived individuals, regardless of their innate play personalities are more violence prone than those of similar play personalities whose lives have been and are including adequate play experiences. The experiences of play, whether social, object, imaginative, etc. has been shown to increase personal empathy, as well as diminish aggressive reactivity to potential violence inducing situations. Additionally, the ability of conflict laden groups (Example—IRA/UK deliberations) to arrive at compromise and non-violent solutions following mutual play experiences has been repeatedly demonstrated. The persistence of entrenched conflict laden positions or points of view in the absence of play or play-induced humor tends to only be resolved through violence or a non-nuanced, rigid win-lose frame of reference. The natural capacity of play to foster play-induced handicapping (if the parties involved are of differential power), and with it non-violent compromise, has been repeatedly demonstrated. By awareness of the play personality of "the other", resolution of highly charged emotional circumstances that otherwise might lead to violence can be defused.

Nature Deficit

In modern lifestyles, many people spend most or all of their time indoors. A failure to incorporate outdoor activities in one's schedule may lead to "Nature Deficit". Contact with nature increases spontaneous play behavior. After ascertaining a person's play personality, either through automatically gathered information or in-person interviews, the play personality may be used to facilitate the reduction or elimination of any Nature Deficit of the person.

For example, automatically-gathered information about the user may include periodic samplings of the GPS coordinates of the user. Based on those GPS coordinates, it may be projected that the person is indoors 95% of the time. Based on this information, a computer system (which may include a mobile device of the user) may perform one or more of the following:
- automatically suggest play opportunities, in the vicinity of the user, that have been filtered to include only outdoor activities
- automatically suggest an outdoor activity to the user
- automatically generate an alert to indicate that the user needs to "go outside and get some fresh air"
- automatically communicate the possibility of Nature Deficit to the user's teacher, friends, or parents
- use "outdoor" as a factor, along with play personality, in selecting which option of multiple available options to suggest to the user Through this system and methods for identifying and actualizing play profiles and play personalities, major benefits for the subject or user will accrue. No such system has been devised prior to the present invention.

Enhancements and Alternatives

As mentioned above, play personalities may be used as the basis for player-centric game design. Games should offer players incentives to do things they want or need to accomplish—not rope them into actions that are not personally meaningful.

Play personalities are organic and biomimetic. Biomimetic gaming through the use of play personalities is aligned with the biology and nature of play of the user/subject. As mentioned above, content may be generated based upon the play personality of the users for whom the content is intended. Thus, play personality may be used to create, synthesize, analyze/process, store, share, and monetize a user's gaming experience.

A gaming economy can also be created based upon play personalities. Such a gaming economy may involve, for example, creating, synthesizing, analyzing/processing, storing, sharing and monetizing user-generated content based upon play personalities.

Play personality data may be combined with extrinsic data from within the same game or other games or sources. In addition, advertising and/or marketing may be based on play personalities, and may be ubiquitously integrated into the design of a game.

The techniques of determining and/or using play personality within a game environment are equally applicable to multi-player games and single-player games. Further, many of the techniques described herein may be employed in offline games, as well as online games. Computer-determined play personalities may drive intrinsic motivation for learning, accomplishing a goal or transforming thinking, feeling, experiences and behavior.

Play Deprivation

Play deprivation occurs when a user and/or group is not getting the type of play that corresponds to the user/group's play personality in sufficient quantities. Play deprivation may be determined by first capturing actions and information by the user/subject (individual or group) to assess, identify and develop play personalities of the user/subject. The determination of the play personality may be performed using any of the various techniques described herein. After the play personality has been determined, it may be compared to the user's actions and experiences, both in the real world and in the virtual world.

If there is or has been play deprivation, then the play personality identification/assessment can help ameliorate the negative compensations of play deficit (depression, OCD, bullying etc) through a focus on offering specific modes of play that fit the individual play personality. Past and/or present play deprivation may be determined through the play personality methodology. The techniques described herein may also be used to determining whether play deprivation has or continues to affect adversely the user/subject and how. As mentioned above, these techniques are applicable to individuals or groups. With respect to group assessment, the techniques described herein may be used to determine whether a school is play deprived. As another example, the techniques described herein may be used to determine whether an apartment complex that has rules against children playing outside play results in children that are play deprived.

Once play deprivation has been determined, play personality can be used to identify and suggest play-based activities corresponding with the play personality to offset the detrimental effects of play deprivation. This includes identifying and suggesting play-based activities corresponding with play personality to sustain pleasure/engagement and enhanced outcomes, including learning and mastery, associated with play. Reducing or eliminating play deprivation also allows users to achieve deeper engagement and sustain activity and/or learning opportunities that develop into measurable mastery of skills, insight, knowledge and competencies. Additional benefits to reducing play deprivation include but are not limited to:

deepening engagement with others also involved in play episodes regardless of play personality match increasing community and conflict resolution the ability to offer products and services that complement the aspirations of the particular subject/user play personality in contrast to promoting false needs and wants through manufacturing extrinsic motivators and external locus of control develop communities to sustain play by those of similar and/or different play personalities develop handicapping play to keep play going develop conflict resolution through engagement of play personalities, and develop collaborations, innovation, and community Wearable Technology The techniques used herein that involve computing mechanisms are not limited in any way to conventional computing technologies, such as desktop computers, laptop computers, tablets and other mobile devices. For example, the techniques described herein may be used in conjunction with wearable technology, such as eye glasses (e.g. Google "Glass"). The capabilities of those technologies may be used both to improve the determination of a user's play personality, and to improve the user's experience with the technology.

For example, in the context of determining a user's play personality, computer-enabled eye glasses may be configured to detect a user's eye movement, pupil size changes, facial expression, etc. while the user is engaging in activities in the real world and/or the virtual world. Based, at least in part, on those inputs captured by the computer-enabled glasses, the computing component on or associated with the glasses may better determine when the user is fully engaged in an activity, and when the user is less engaged. This information, when correlated with information about the nature of the activities in which the user is engaged, may be used as a factor in determining the play personality of the user.

With respect to adapting the operation of such technology based on a user's play personality, the types of adaptations that are possible are virtually limitless. For example, computer-enabled glasses may be configured to visually highlight real-world locations that are associated with activities that correspond well with the user's play personality. If, for example, a user's narrative play score is relatively high, the computer-enabled glasses may provide some form of visual highlighting when the user looks through the glasses at a library. Alternatively, the computer-enabled glasses may display color-coded indicators, where the color of the indicator associated with a real-world store/building/venue that is viewed through the glasses indicates what type of play is associated with the store/building/venue and/or how strongly the store/building/venue correlates with the user's play personality.

As another example, a person may enter into a device the results of their Play Personality (which they may have uncovered from elsewhere), and the device may then geo-locate play opportunities for the user. Instead of or in addition to geo-locating play opportunities, the device may be configured to measure how much play that day corresponds to the play personality, etc. For example, computer-enabled glasses may prompt, "please enter your play personality weights you ascertained from Facebook". After the information has been entered, the computer-enabled glasses will locate and measure play opportunities for the user.

Bartle Typologies for Gaming/Gamification

The techniques described herein involves the creation of new and/or enhanced Bartle Typologies (and their variants) for gaming/gamification. Unlike Bartle Typologies, these techniques integrate emergent human play personalities grounded in human neuroscience, biology, human temperament and attunement, intrinsic motivators, play histories and environmental triggers.

The Bartle Typologies are based upon character theory comprised in its most basic form of four characters (Achievers, Explorers, Socializers, and Killers). Since Richard A. Bartle's publication of these player types in 1996, *Hearts, Clubs, Diamonds, Spades: Players Who Suit MUDS* (http://mud.co.uk/richard/hcds.htm), they have become the best-known design patterns in online gaming and in the burgeoning gamification field. These Bartle Typologies and its variant forms are based upon player behavior derived from long-term, game-based focus groups.

As noted in *Player Types and Gamification* by Dan Dixon, "Bartle's work, and many others' is based on particular games or genres. It is difficult to generalise outside the context that the research was carried out in. There is also a methodological problem in interpreting in-game behaviours as specific motivations or play preferences without actually engaging in qualitative research with players." Dixon also points out Bartle Typology limitations: "It is tempting to create a generalised schema or taxonomy of player types. However the insights generated and the types of behaviours are constrained by the particular games and the game cultures around each." http://gamification-research.org/wp-content/uploads/2011/04/11-Dixon.pdf In contrast, play personalities as described above are not simply archetypes constructed out of multi-user domain games, but emerge naturally from the self-organizing biological survival drive to play. Based on the play personality, technological devices can be configured to better intuit/discern what is intrinsically meaningful and motivating to the user, thusly becoming biomimetic in design and construction, as Astro Teller of Google X says, finally getting technology "to its higher purpose, which is to get it out of the way." Further, once the play personality is determined, software within the devices may automatically configure the devices to act differently based on what that individual user finds meaningful, thereby improving the technology itself. In such a manner, technology applications become player-centric and can reflect and scaffold upon the user's intrinsic motivators, engendering and engaging long-term behavioral change motivated from within the user.

Dan Dixon's *Player Types and Gamification* continues to explain in more detail the current limitation of applying Bartle Typologies to gamification, "All the research described here is on digital games, not gamified services. Although some aspects can be extrapolated from one domain to another, not all research about digital games can be applied directly to the gamification of other applications. There is also real danger that the design of gamified systems will continue to be based on non-empirical research from the wrong context, ultimately leading to commercial failure and user disappointment." This commercial failure was anticipated by Gartner Research, as cited above, and is according to them actually reaching their 80% rate of failure. http://www.gamification.co/2013/12/18/gartner-bad-gamification-initiatives-still-fail-2014/

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
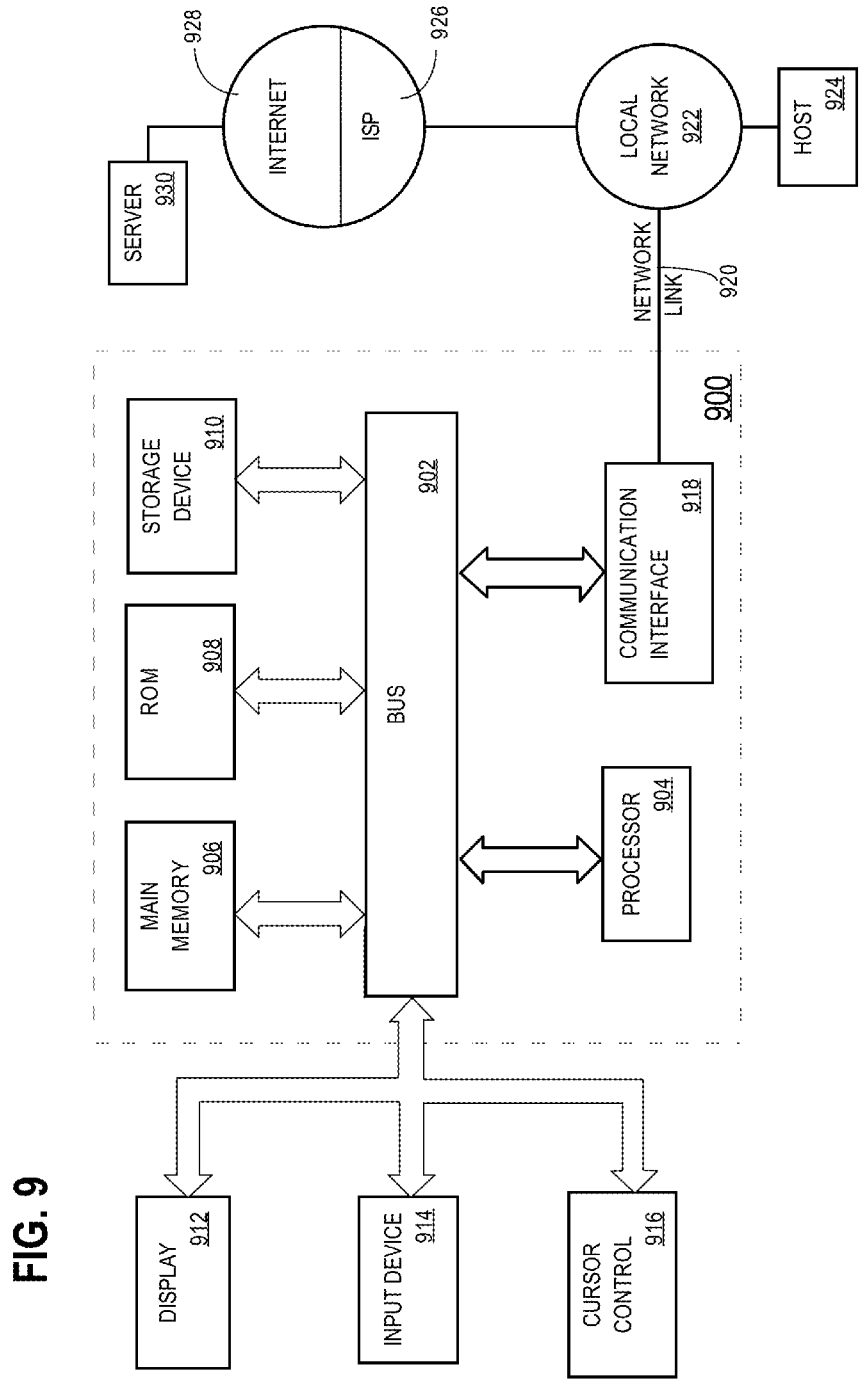
FIG. 9 is a block diagram that illustrates a computer system upon which embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Computer system 900 may also operate based on voice input and/or face recognition.

Computer system 900 may be programmed to recognize faces and/or play triggers. With respect to face recognition, a camera may be operative coupled to computer system 900. In response to initiation of a computer-based game, the system may cause the camera to capture a picture of the user. The picture thus captured may be compared against previously-stored images of users. Upon finding a match, the player profile associated with the match may be used as the basis for customizing the game experience, as discussed above.

Computer system 900 may also be programmed to recognize play triggers expressed by users. For example, a camera may actions performed by a user. Those actions may be analyzed by the computer to determine whether the actions match behavior patterns associated with play triggers. When the detected user actions match the behavior pattern associated with a play trigger, the player may be in a "game playing mood". Therefore, in response to detecting the user's play trigger action, the computer 900 may perform one or more actions to invite the user to play a game. For example, the computer may display a message that says "would you like to play game X now?" or "I challenge you to play game X". The game to which the user is automatically invited may be selected based, for example, on the type of play trigger that was recognized and/or the play profile of the user (whose identity may be determined by face recognition).

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method for adapting operation of a computing device based on a play personality of a user, comprising:
   obtaining information that indicates the play personality of the user;
   wherein the information indicates which play type, of a plurality of play types, satisfies the user's need for play;
   wherein the plurality of play types includes two or more of: Object, Pretend, Social, Rough and Tumble, Body, Exploratory, Celebratory, Competitive, Ritual, Narrative, Fantasy or Games/Gaming;
   determining that the user is using the computing device;
   during execution of software that generates output displayed on the computing device while the user is using the device, adapting operation of the software based, at least in part, on the play personality of the user;

wherein the method is performed by one or more computing devices;
wherein the one or more computing devices include the computing device.

2. The method of claim 1 wherein the software is a digital game, and the step of adapting operation of the software includes selecting a game challenge for the user based, at least in part, on the play personality of the user.

3. The method of claim 1 wherein adapting operation of the software includes:
   making a determination that a particular place is associated with an activity;
   determining one or more play types that are associated with the activity;
   comparing the one or more play types to the play personality of the user to determine whether the one or more play types are play types that satisfy the user's need for play; and
   responsive to determining that the one or more play types are play types that satisfy the user's need for play, adapting operation of the software based, at least in part, on the determination that the particular place is associated with an activity that is likely to satisfy the user's need for play;
   wherein the particular place is one of:
      a real-world store,
      a real-world building,
      a real-world venue,
      a virtual store, or
      a virtual venue.

4. The method of claim 1 wherein adapting operation of the software comprises changing at least one aspect of visual appearance of an avatar of the user based on the play personality of the user.

5. The method of claim 1 wherein adapting operation of the software comprises changing one or more abilities afforded an avatar of the user based on the play personality of the user.

6. The method of claim 1 wherein adapting operation of the software comprises adjusting non-visual attributes of an avatar of the user based on the play personality of the user.

7. The method of claim 1 wherein adapting operation of the software comprises adjusting how one or more non-playing characters act relative to an avatar of the user based on the play personality of the user.

8. The method of claim 1 wherein adapting operation of the software comprises automatically selecting which quest, problem or challenge, of a plurality of available quests, problems or challenges, to present to either the user, or an avatar of the user, based on the play personality of the user.

9. The method of claim 1 wherein adapting operation of the software comprises automatically selecting how successful completion, by the user, of a task is rewarded based on the play personality of the user.

10. One or more non-transitory computer-readable media storing instructions which, when executed on one or more computing devices, cause the one or more computing devices to perform a method comprising:
   obtaining information that indicates the play personality of the user;
   wherein the information indicates which play type, of a plurality of play types, satisfies the user's need for play;
   wherein the plurality of play types includes two or more of: Object, Pretend, Social, Rough and Tumble, Body, Exploratory, Celebratory, Competitive, Ritual, Narrative, Fantasy or Games/Gaming;
   determining that the user is using the computing device; and
   during execution of software that generates output displayed on the computing device while the user is using the device, adapting operation of the software based, at least in part, on the play personality of the user.

11. The one or more non-transitory computer-readable media of claim 10 wherein the software is a digital game, and the step of adapting operation of the software includes selecting a game challenge for the user based, at least in part, on the play personality of the user.

12. The one or more non-transitory computer-readable media of claim 10 wherein adapting operation of the software includes:
   making a determination that a particular place is associated with an activity;
   determining one or more play types that are associated with the activity;
   comparing the one or more play types to the play personality of the user to determine whether the one or more play types are play types that satisfy the user's need for play; and
   responsive to determining that the one or more play types are play types that satisfy the user's need for play, adapting operation of the software based, at least in part, on the determination that the particular place is associated with an activity that is likely to satisfy the user's need for play;
   wherein the particular place is one of:
      a real-world store,
      a real-world building,
      a real-world venue,
      a virtual store, or
      a virtual venue.

13. The one or more non-transitory computer-readable media of claim 10 wherein adapting operation of the software comprises changing at least one aspect of visual appearance of an avatar of the user based on the play personality of the user.

14. The one or more non-transitory computer-readable media of claim 10 wherein adapting operation of the software comprises changing one or more abilities afforded an avatar of the user based on the play personality of the user.

15. The one or more non-transitory computer-readable media of claim 10 wherein adapting operation of the software comprises adjusting non-visual attributes of an avatar of the user based on the play personality of the user.

16. The one or more non-transitory computer-readable media of claim 10 wherein adapting operation of the software comprises adjusting how one or more non-playing characters act relative to an avatar of the user based on the play personality of the user.

17. The one or more non-transitory computer-readable media of claim 10 wherein adapting operation of the software comprises automatically selecting which quest, of a plurality of available quests, to present to an avatar of the user based on the play personality of the user.

18. The one or more non-transitory computer-readable media of claim 10 wherein adapting operation of the software comprises automatically selecting how successful completion, by the user, of a task is rewarded based on the play personality of the user.

19. The method of claim 3 wherein:
   the particular place is a real-world place; and
   adapting operation of the software includes causing a display, controlled by the computing device, to generate a visual indication that the real-world place is associated with an activity that corresponds to a play type that satisfies the user's need for play.

20. The method of claim 19 wherein the display is on computer-enabled glasses, and the visual indication is generated when the user views the real-world place through the computer-enabled glasses.

21. The method of claim 3 wherein:
the method further comprises receiving, at the computing device, a request to geo-locate play opportunities for the user; and
the steps of
making a determination that a particular place is associated with an activity;
determining one or more play types that are associated with the activity;
comparing the one or more play types to the play personality of the user to determine whether the one or more play types are play types that satisfy the user's need for play; and
responsive to determining that the one or more play types are play types that satisfy the user's need for play, adapting operation of the software based, at least in part, on the determination that the particular place is associated with an activity that is likely to satisfy the user's need for play;
are performed in response to the request to geo-locate play opportunities for the user.

22. The method of claim 1 wherein adapting operation of the software based, at least in part, on the play personality of the user includes determining how much play, performed by the user on a given day, corresponds to one or more play types that the play personality indicates satisfy the user's need for play.

23. The one or more non-transitory computer-readable media of claim 12 wherein:
the particular place is a real-world place; and
adapting operation of the software includes causing a display, controlled by the computing device, to generate a visual indication that the real-world place is associated with an activity that corresponds to a play type that satisfies the user's need for play.

24. The one or more non-transitory computer-readable media of claim 23 wherein the display is on computer-enabled glasses, and the visual indication is generated when the user views the real-world place through the computer-enabled glasses.

25. The one or more non-transitory computer-readable media of claim 12 wherein:
the method further comprises receiving, at the computing device, a request to geo-locate play opportunities for the user; and
the steps of
making a determination that a particular place is associated with an activity;
determining one or more play types that are associated with the activity;
comparing the one or more play types to the play personality of the user to determine whether the one or more play types are play types that satisfy the user's need for play; and
responsive to determining that the one or more play types are play types that satisfy the user's need for play, adapting operation of the software based, at least in part, on the determination that the particular place is associated with an activity that is likely to satisfy the user's need for play;
are performed in response to the request to geo-locate play opportunities for the user.

26. The one or more non-transitory computer-readable media of claim 10 wherein adapting operation of the software based, at least in part, on the play personality of the user includes determining how much play, performed by the user on a given day, corresponds to one or more play types that the play personality indicates satisfy the user's need for play.

* * * * *